(12) United States Patent
Li et al.

(10) Patent No.: US 12,382,868 B2
(45) Date of Patent: Aug. 12, 2025

(54) EFFICIENT REED HARVESTER

(71) Applicant: Jiangsu University, Jiangsu (CN)

(72) Inventors: Yaoming Li, Jiangsu (CN); Kuizhou Ji, Jiangsu (CN); Binbin Ji, Jiangsu (CN); Yanbin Liu, Jiangsu (CN); Zhenwei Liang, Jiangsu (CN); Hanhao Wang, Jiangsu (CN); Junhui Cheng, Jiangsu (CN); Zhiwu Yu, Jiangsu (CN); Tao Zhang, Jiangsu (CN); Tuo Du, Jiangsu (CN); Guoliang You, Jiangsu (CN); Ying Wu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/840,501

(22) PCT Filed: Nov. 24, 2023

(86) PCT No.: PCT/CN2023/133841
§ 371 (c)(1),
(2) Date: Aug. 22, 2024

(87) PCT Pub. No.: WO2024/159887
PCT Pub. Date: Aug. 8, 2024

(65) Prior Publication Data
US 2025/0176466 A1     Jun. 5, 2025

(30) Foreign Application Priority Data
Nov. 1, 2023   (CN) .......................... 202311440805.3

(51) Int. Cl.
*A01D 45/00*     (2018.01)
*A01D 57/22*     (2006.01)
(Continued)

(52) U.S. Cl.
CPC ............. *A01D 45/00* (2013.01); *A01D 57/22* (2013.01); *A01D 59/04* (2013.01); *A01D 61/006* (2013.01); *A01D 61/02* (2013.01); *A01D 85/005* (2013.01)

(58) Field of Classification Search
CPC ........ A01D 44/00–44/02; A01D 45/00–45/30; A01D 57/22; A01D 85/005;
(Continued)

(56) References Cited

FOREIGN PATENT DOCUMENTS

| CN | 104012249 | 9/2014 | |
|----|-----------|--------|---|
| CN | 107094434 A * | 8/2017 | ............. A01D 57/01 |

(Continued)

OTHER PUBLICATIONS

Ji Binbin et al., "Reed Harvesting Technology and Equipment", Agricultural Engineering, Jun. 2021, submit with English abstract, pp. 11-16.
"International Search Report (Form PCT/ISA/210) of PCT/CN2023/133841," mailed on Jul. 18, 2024, pp. 1-8.

*Primary Examiner* — Joseph M Rocca
*Assistant Examiner* — Madeline I Runco
(74) *Attorney, Agent, or Firm* — JCIPRNET

(57) ABSTRACT

An efficient reed harvester, including a preharvest detection unit, a cutting device, a conveyor device, a baling-stacking device, a chassis, and a control unit, where the preharvest detection unit is configured to detect height information of reeds in a preharvest region, and transmit to the control unit; the conveyor device is configured to gather and clamp stems of the reeds, and convey the stems backward to the baling-stacking device; the control unit is configured to calculate an average height $h_{avg}$ of the reeds in the preharvest region according to the height information of the reeds in the preharvest region, and adjust a height of the conveyor device according to the average height of the reeds; and the control unit is configured to control the baling-stacking device to
(Continued)

stack the small bales of reeds vertically or horizontally, and knot the small bales of reeds into the big bale.

13 Claims, 26 Drawing Sheets

(51) Int. Cl.
*A01D 59/04* (2006.01)
*A01D 61/00* (2006.01)
*A01D 61/02* (2006.01)
*A01D 85/00* (2006.01)

(58) Field of Classification Search
CPC ........ A01D 61/00–61/04; A01D 59/04; A01D 61/006; A01D 61/02
See application file for complete search history.

(56) References Cited

FOREIGN PATENT DOCUMENTS

| | | | | |
|---|---|---|---|---|
| CN | 110393075 A | * | 11/2019 | |
| CN | 110583222 A | * | 12/2019 | ............. A01D 45/00 |
| CN | 111226571 | | 6/2020 | |
| CN | 112056085 A | * | 12/2020 | ............. A01D 45/00 |
| CN | 114097418 | | 3/2022 | |
| CN | 115586538 | | 1/2023 | |
| FR | 3012286 | | 5/2015 | |

* cited by examiner

EFFICIENT REED HARVESTER

CROSS-REFERENCE TO RELATED APPLICATION

This application is a 371 of international application of PCT application serial no. PCT/CN2023/133841, filed on Nov. 24, 2023, which claims the priority benefit of China application no. 202311440805.3, filed on Nov. 1, 2023. The entirety of each of the above-mentioned patent applications is hereby incorporated by reference herein and made a part of this specification.

TECHNICAL FIELD

The present disclosure belongs to the technical field of agricultural machinery, and particularly relates to an efficient reed harvester.

TECHNICAL BACKGROUND

As perennial herbs in the grass family of phragmites, reeds have a developed grapevine root-like stem that is hollow and smooth, and are high-stem crops in wetlands. Due to a harsh growing environment, the reeds are harvested manually with a high labor intensity and low harvesting efficiency.

Most of existing reed harvesters are improved from harvesters for rice, wheat and other short-stem crops, and only work for cutting and spreading. After roots are cut by a header of the harvester, the reeds are spread in situ, and are manually gathered and baled. This is hardly achieved for reeds with a thick and long stem, thus causing a high machine failure rate, a high loss rate in reed harvesting, low efficiency, etc. Moreover, most of the existing reed harvesters use a single-layer cutting conveyor device. Due to the high stem of the reeds, the reeds are prone to stress imbalance when fed by the single-layer cutting conveyor device. In view of lodging of the reeds in a mature period, the reeds cannot be conveyed and cut by the single-layer cutting conveyor device efficiently to cause omitted harvesting. On the other hand, in harvesting of the reed harvester, a height of the conveyor device cannot be adjusted in real time to cause low efficiency and poor adaptability. At present, in addition to manual harvesting, the reeds are harvested poorly by a machine. The baled reeds are put into a feed box manually with a high labor intensity, and a waste of time and energy. For the existing harvesters, there lacks a function for cleaning bottom debris of the stems of the reeds to affect harvesting quality. Due to reasons such as the harsh growing environment of the reeds, different heights of the reeds, and subsidence of the harvester, after the harvested reeds are baled and conveyed backward, the non-uniform bottom roots of the reeds are disadvantageous for conveyance and stacking.

In short, the existing reed harvesters cannot harvest the reeds efficiently at high quality.

SUMMARY OF THE INVENTION

In view of the above technical problems, the present disclosure provides an efficient reed harvester. The efficient reed harvester harvests reeds efficiently, and is also applicable to harvesting other high-stem crops.

It is to be noted that disclosures on these objectives do not exclude presence of other objectives. One implementation in the present disclosure is unnecessarily intended to realize all of the above objectives. Objectives rather than the above objectives can be extracted from the disclosures on the specification, accompanying drawings and claims.

The present disclosure achieves the above technical objective through following technical solutions.

An efficient reed harvester includes a preharvest detection unit, a cutting device, a conveyor device, a baling-stacking device, a chassis, and a control unit, where the preharvest detection unit, the cutting device, the conveyor device, the baling-stacking device, and the control unit are provided on the chassis; and the chassis is a crawler chassis; the preharvest detection unit is configured to detect height information of reeds in a preharvest region, and transmit the height information to the control unit; the cutting device is configured to cut stems of the reeds; the conveyor device is configured to gather and clamp the stems of the reeds, and convey the stems backward to the baling-stacking device; the baling-stacking device is located behind the conveyor device, and the baling-stacking device is configured to knot the reeds into small bales, stack the small bales of the reeds vertically or horizontally, and knot the small bales of the reeds into a big bale; the control unit is connected to the preharvest detection unit, the cutting device, the conveyor device, and the baling-stacking device; the control unit is configured to calculate an average height $h_{avg}$ of the reeds in the preharvest region according to the height information of the reeds in the preharvest region, and adjust a height of the conveyor device according to the average height of the reeds; and the control unit is configured to control the baling-stacking device to stack the small bales of the reeds vertically or horizontally, and knot the small bales of the reeds into the big bale. In the above solution, the preharvest detection unit includes a laser radar; the laser radar is configured to scan to-be-harvested reeds in front of a header at a sampling interval T, acquire point cloud data for reflection points of the to-be-harvested reeds in a polar coordinate of the laser radar, and transmit the point cloud data to the control unit; and the control unit is configured to process the point cloud data to obtain a point cloud in a square region specified in front of the header, uniformly segment the square region into a plurality of sub-regions that are equal, calculate a maximum of a point cloud y coordinate in each of the plurality of sub-regions, take the maximum $y_{ijmax}$ as an average height of reeds in each of the plurality of sub-regions, and seek an average $y_{avg}$ in the square region according to the $y_{ijmax}$ representing the average height of the reeds in each of the plurality of sub-regions, where the average represents the average height $h_{avg}$ of the reeds in the preharvest region.

In the above solution, the conveyor device includes an upstanding clamping longitudinal conveyor device and a transverse conveyor device; the upstanding clamping longitudinal conveyor device is provided behind the transverse conveyor device; the transverse conveyor device is configured to gather the reeds at two sides to a middle and convey the reeds to the upstanding clamping longitudinal conveyor device; and the upstanding clamping longitudinal conveyor device is configured to clamp the stems of the reeds and convey the stems backward to the baling-stacking device.

Further, the transverse conveyor device includes an upper transverse conveyor mechanism, an intermediate transverse conveyor mechanism, a lower transverse conveyor mechanism, a height sensor, a transverse conveyor device hydraulic cylinder set, and a displacement sensor; the upper transverse conveyor mechanism is provided uppermost; a plurality of feeding teeth are arranged on the upper transverse conveyor mechanism; the upper transverse conveyor mechanism is configured to gather and clamp upper portions of the stems of the reeds and feed the upper portions; the intermediate transverse conveyor mechanism is provided under the upper transverse conveyor mechanism; a plurality of feeding teeth are arranged on the intermediate transverse conveyor mechanism; the intermediate transverse conveyor mechanism is configured to gather and clamp intermediate portions of the stems of the reeds and feed the intermediate portions; the lower transverse conveyor mechanism is provided under the intermediate transverse conveyor mechanism; the lower transverse conveyor mechanism is provided with a plurality of feeding fingers; the lower transverse conveyor mechanism is configured to gather and clamp lower portions of the stems of the reeds and feed the lower portions; the height sensor is configured to detect a height of the intermediate transverse conveyor mechanism; the transverse conveyor device hydraulic cylinder set is provided between the upper transverse conveyor mechanism and the intermediate transverse conveyor mechanism, and the transverse conveyor device hydraulic cylinder set is configured to control a distance between the upper transverse conveyor mechanism and the intermediate transverse conveyor mechanism; the displacement sensor is configured to detect an amount of expansion and contraction of the transverse conveyor device hydraulic cylinder set; and the control unit is connected to the height sensor, the transverse conveyor device hydraulic cylinder set, and the displacement sensor, and the control unit is configured to adjust the height of the intermediate transverse conveyor mechanism through the transverse conveyor device hydraulic cylinder set according to detection information of the height sensor and the displacement sensor.

Further, the upper transverse conveyor mechanism and the intermediate transverse conveyor mechanism are structurally the same, and each include transverse conveyor units opposite to each other; a conveyor roller is provided between the upper transverse conveyor mechanism and the intermediate transverse conveyor mechanism; a belt is provided on the conveyor roller; the transverse conveyor units each include a driving sprocket, a driven sprocket, a conveyor chain strip, an inner chain plate, the plurality of feeding teeth, a support frame, a reed separating ring, and an annular support arm; the driving sprocket and the driven sprocket are provided on the support frame; the conveyor chain strip is provided on the driving sprocket and the driven sprocket; the inner chain plate is provided on the conveyor chain strip; the transverse conveyor device hydraulic cylinder set is provided under the support frame; the plurality of feeding teeth are uniformly arranged on the inner chain plate; the annular support arm includes a top connected to the reed separating ring, and a bottom connected to the transverse conveyor device hydraulic cylinder set; the reed separating ring is provided at a periphery of the conveyor chain strip; the conveyor roller is connected to an upper hydraulic motor; both the driving sprocket of the upper transverse conveyor mechanism and the driving sprocket of the intermediate transverse conveyor mechanism are connected to the conveyor roller; the upper hydraulic motor drives the conveyor roller to rotate; and the conveyor roller drives the conveyor chain strip of the upper transverse conveyor mechanism and the conveyor chain strip of the intermediate transverse conveyor mechanism to rotate synchronously.

Further, the lower transverse conveyor mechanism includes lower transverse conveyor units opposite to each other; the lower transverse conveyor units each include a driving pulley, a driven pulley, a conveyor belt, a plurality of mounting seats, the plurality of feeding fingers, a lower support frame, a lower support post, a support arm, and a lower hydraulic motor; the support arm is provided on a harvester frame; the lower support post is provided on the support arm; the lower support frame is provided on the lower support post; the driving pulley and the driven pulley are provided on the lower support frame; the driving pulley is connected to the lower hydraulic motor; the conveyor belt is provided on the driving pulley and the driven pulley; the plurality of mounting seats are uniformly arranged on the conveyor belt; and the plurality of feeding fingers are respectively provided on the plurality of mounting seats.

Further, the efficient reed harvester further includes a knife height sensor; the knife height sensor is connected to the control unit; the knife height sensor is configured to detect a height $h_1$ of a knife, and transmit the height $h_1$ to the control unit; the control unit is configured to calculate an actual length $h_2 = h_{avg} - h_1$ of harvested reeds according to the average height $h_{avg}$ of the reeds and the height $h_1$ of the knife, and adjust the amount of expansion and contraction of the transverse conveyor device hydraulic cylinder set according to the detection information of the height sensor and the displacement sensor, such that the intermediate transverse conveyor mechanism is located at $$\frac{2h_2}{3}$$

for feeding.

In the above solution, the upstanding clamping longitudinal conveyor device includes two symmetric upstanding longitudinal conveyor mechanisms and a clamping conveyor chain height adjustment mechanism; the two symmetric upstanding longitudinal conveyor mechanisms clamp upstanding reeds when longitudinally conveying the reeds; the clamping conveyor chain height adjustment mechanism includes a position sensor and a lifting device; the position sensor is configured to detect a current height of the two symmetric upstanding longitudinal conveyor mechanisms, and transmit the current height to the control unit; the lifting device is connected to the two symmetric upstanding longitudinal conveyor mechanisms; the control unit is connected to the lifting device; and the control unit is configured to calculate a height of a gravity center of the reeds according to the average height $h_{avg}$ of the reeds in the preharvest region and the height $h_1$ of the knife above the ground, seek a height difference between the height of the gravity center of the reeds and the current height of the two symmetric upstanding longitudinal conveyor mechanisms, and control, according to the height difference, the lifting device to adjust a height of the two symmetric upstanding longitudinal conveyor mechanisms to correspond to the gravity center of the reeds in the preharvest region.

Further, the lifting device includes a speed reduction motor, a coupled twin winch, a first pulley set, a second pulley set, a support, and a sleeve; the support is provided at two sides of the upstanding clamping longitudinal conveyor device; the support is connected to a girder of the header; the upstanding clamping longitudinal conveyor device is connected to a vertical beam of the support through the sleeve; the speed reduction motor and the coupled twin winch are provided on a top of the support; the first pulley set is provided at two sides of an upper portion of the support, and connected to an upper portion of the upstanding clamping longitudinal conveyor device; the second pulley set is provided at two sides of a lower portion of the support, and connected to a lower portion of the upstanding clamping longitudinal conveyor device; a wire rope of the first pulley set and of the second pulley set is connected to the coupled twin winch; and the coupled twin winch driven by the speed reduction motor drives the wire rope to realize retraction and release of the wire rope, thereby driving the upstanding clamping longitudinal conveyor device to move up and down along the vertical beam of the support.

Further, the two symmetric upstanding longitudinal conveyor mechanisms each include an upstanding conveyor unit and a sleeve; the upstanding conveyor unit includes a traction roller, a driven roller, a clamping conveyor chain, an upper beam, and a lower beam; the upper beam is located above the lower beam; the traction roller includes one end connected to one end of the upper beam, and an other end connected to one end of the lower beam; the driven roller includes one end connected to an other end of the upper beam, and an other end connected to an other end of the lower beam; the clamping conveyor chain surrounds the traction roller and the driven roller; the upper beam and the lower beam are connected to the sleeve; the sleeve is provided on a vertical beam of the support; and the sleeve is slidable up and down along the vertical beam of the support, thereby driving the upstanding conveyor unit to move up and down.

In the above solution, the baling-stacking device includes a knotter, a feed box, and a stacking mechanism; the stacking mechanism is located between the knotter and the feed box; the knotter is configured to knot the reeds into the small bales; the stacking mechanism is configured to stack the small bales of the reeds to the feed box vertically or horizontally; the feed box is configured to knot the small bales of the reeds into the big bale; the feed box includes a feed box housing; a baling mechanism is provided in the feed box housing; the baling mechanism includes a wire clamp and a drive mechanism; the wire clamp is configured to clamp a steel wire; the drive mechanism is configured to drive the wire clamp to knot the small bales of the reeds into the big bale; the control unit is connected to the feed box and the stacking mechanism; and the control unit is configured to control the stacking mechanism to stack the small bales of the reeds to the feed box vertically or horizontally, and control the feed box to knot the small bales of the reeds into the big bale.

Further, the stacking mechanism includes a first mechanical clamp, a second mechanical clamp, and a drive component connected to the control unit; the first mechanical clamp and the second mechanical clamp are opposite to each other; the first mechanical clamp and the second mechanical clamp are connected to the drive component; the drive component is configured to drive the first mechanical clamp and the second mechanical clamp to move along an X-axis direction, a Y-axis direction, and a Z-axis direction; and the first mechanical clamp and the second mechanical clamp are configured to clamp and stack the small bales of the reeds to the feed box.

In the above solution, the efficient reed harvester further includes a root debris cleaning device; the root debris cleaning device is provided under the upstanding clamping longitudinal conveyor device; the root debris cleaning device includes a brush, a rotating shaft, and a motor; the rotating shaft is connected to an output shaft of the motor; and the brush is provided on the rotating shaft.

In the above solution, the efficient reed harvester further includes a root disc knife apparatus; and the root disc knife apparatus includes a disc knife device, a drive device, a height adjusting device, and a vibration damping device;
the height adjusting device is provided on a harvester frame;
the disc knife device is provided on the height adjusting device;
the vibration damping device is provided on the disc knife device;
the drive device is connected to the disc knife device, and provides power for the disc knife device; and
the disc knife device includes a plurality of disc knives and a knife rest; and the plurality of disc knives are provided on the knife rest equidistantly.

Further, the drive device includes a plurality of pinions, a plurality of gears, two transmission pulleys, a transmission belt, and a hydraulic motor;
the plurality of pinions are arranged on the knife rest, and respectively connected to the plurality of disc knives through a transmission shaft;
the plurality of gears each are provided between and engaged with two adjacent ones of the plurality of pinions;
one of the two transmission pulleys is provided on the transmission shaft between one of the plurality of pinions and a corresponding one of the plurality of disc knives, and an other of the two transmission pulleys is provided at an output end of the hydraulic motor; and
the transmission belt is provided on the two transmission pulleys.

Further, the height adjusting device includes a first side plate, a second side plate, a first height adjustment hydraulic cylinder, a second height adjustment hydraulic cylinder, a first height adjusting rod, and a second height adjusting rod;
the first side plate and the second side plate are respectively provided at two sides of the knife rest;
the first height adjusting rod includes one end connected to the knife rest, and an other end connected to the first height adjustment hydraulic cylinder; and
the second height adjusting rod includes one end connected to the knife rest, and an other end connected to the second height adjustment hydraulic cylinder.

Further, the vibration damping device includes vibration absorbers; and the vibration absorbers are respectively provided on the first side plate and the second side plate.

Further, the vibration damping device further includes damping springs;
the first side plate and the second side plate are respectively provided with the damping springs;
the damping spring at one side of the first side plate includes one end connected to the first side plate, and an other end connected to the first height adjustment hydraulic cylinder; and
the damping spring at one side of the second side plate includes one end connected to the second side plate, and an other end connected to the second height adjustment hydraulic cylinder.

Compared with the prior art, the present disclosure has the following advantages.

The efficient reed harvester provided by the present disclosure can harvest reeds efficiently, and can also be applied to harvesting other high-stem crops.

According to an implementation of the present disclosure, by acquiring the height information of the reeds in the preharvest region and adjusting the height of the conveyor device in real time, the present disclosure can make the conveyor device adapted for different heights of the reeds through height adjustment, and can clamp the reeds reliably and tidily for conveyance, thereby greatly improving tidiness of the reeds in the reed conveyance, being more convenient for subsequent bale knotting of the reeds, and achieving higher harvesting efficiency.

According to an implementation of the present disclosure, the upper transverse conveyor mechanism, the intermediate transverse conveyor mechanism, and the lower transverse conveyor mechanism are provided. The upper transverse conveyor mechanism, the intermediate transverse conveyor mechanism, and the lower transverse conveyor mechanism each are provided with the feeding fingers or feeding teeth. The present disclosure can cope with stress imbalance caused by high stems of the reeds, and lodging of the reeds in a mature period, can convey the reeds more easily, and facilitates effective cutting.

According to an implementation of the present disclosure, the laser radar, the knife height sensor, and the height sensor are used to respectively acquire the height of the reed, the height of the knife, and the height of the transverse conveyor mechanism. The present disclosure can automatically adjust the height of the transverse conveyor mechanism, ensure that the gravity center of the fed reed is stressed, and prevent the stem of the reed from breaking at a middle due to stress imbalance. The present disclosure can realize tide and sequential transverse conveyance of the reeds, and improves conveyance efficiency of the harvester.

According to an implementation of the present disclosure, the reed separating ring is provided on an outer race of the conveyor chain of each of the upper transverse conveyor mechanism and the intermediate transverse conveyor mechanism. With the reed separating ring, the stems of the reeds are prevented from entering the conveyor chain to make the structure stuck to cause a conveyance failure. In addition, the reed separating ring can further support the feeding teeth on the conveyor chain, such that the feeding teeth does not bend downward to cause deformation when conveying the reeds.

According to an implementation of the present disclosure, with a movable design of the upstanding clamping longitudinal conveyor device, the present disclosure can make the conveyor device adapted for different heights of the reeds through height adjustment, and can clamp the reeds reliably and tidily for conveyance.

According to an implementation of the present disclosure, by adjusting the height of the whole conveyor device with the pulley set, the present disclosure greatly simplifies a height adjustment mechanism and saves a cost. On the other hand, the pulley set cooperates with the wire rope to drive the upstanding clamping longitudinal conveyor device to move, such that the upstanding clamping longitudinal conveyor device is stressed more uniformly, and moves more reliably.

According to an implementation of the present disclosure, the root debris cleaning device can clean debris such as mud and weeds at the bottoms of the stems of the reeds in conveyance, which improves harvesting quality of the reeds.

According to an implementation of the present disclosure, the root disc knife apparatus can cut bottom roots of the reeds in conveyance, such that the bottom roots are tide. This facilitates conveyance, knotting and stacking, and further improves the harvesting efficiency.

According to an implementation of the present disclosure, the baling-stacking device can knot the reeds into the small bales, stack the small bales to the feed box vertically or horizontally, and then knot the small bales of reeds into the big bale. The knotted big bale is unloaded by a machine. This improves the harvesting efficiency.

According to an implementation of the present disclosure, the present disclosure clamps the baled reeds through the mechanical clamps at two sides. The left and right mechanical clamps clamp and release the bales of reeds through the drive component. The clamped bales of reeds are stacked to the feed box vertically or horizontally. When the feed box is stacked completely, the small bales of reeds are knotted into the big bale through a baler in the feed box.

With the mechanical clamps for stacking the bales of reeds instead of the manual work, the present disclosure greatly reduces a labor intensity, improves working efficiency and an intelligent level of the reed harvester, and provides a desirable technical support for intelligent harvesting of the reed harvester. Since the mechanical clamps can realize vertical and horizontal stacking, the present disclosure is flexible in structure, and applicable to the feed box to unload the reeds in different directions.

According to an implementation of the present disclosure, the crawler chassis can be applicable to deep mud fields and wetlands, and is not prone to subsidence. With a low pressure to the ground, the crawler chassis can protect soil, and prevent a plow pan, thereby realizing moisture conservation and drought control. It can further prevent damage to a hardcore of the field, and ensure normal cultivation of the field. It has a large tractive force, high traction efficiency, a strong passing ability, and a strong climbing ability. The crawler tractor features a low gravity center, a large adhesion coefficient, desirable slope stability against overturning and slippage, maneuverability for a small turning radius, cross-country performance for the strong climbing ability, etc.

It is to be noted that disclosures on these effects do not exclude presence of other effects. One implementation of the present disclosure unnecessarily has all of the above effects. Effects rather than the above effects can be seen and extracted apparently from the disclosures on the specification, accompanying drawings and claims.

DESCRIPTION OF THE DRAWINGS

FIGS. 7A and 7B is a schematic structural view of a lower transverse conveyor mechanism according to an implementation of the present disclosure, in which FIG. 7A is an overall schematic structural view of the lower transverse conveyor mechanism, and FIG. 7B is a schematic structural view of a lower support post and a support arm;

FIGS. 35A-35C is a schematic view of a baling process in horizontal stacking according to an implementation of the present disclosure, in which FIG. 35A illustrates an initial state when reeds are sleeved by a steel wire, FIG. 35B illustrates an intermediate process when the steel wire rotates for knotting, and FIG. 35C illustrates a process after the steel wire rotates for the knotting.

Figure 1:
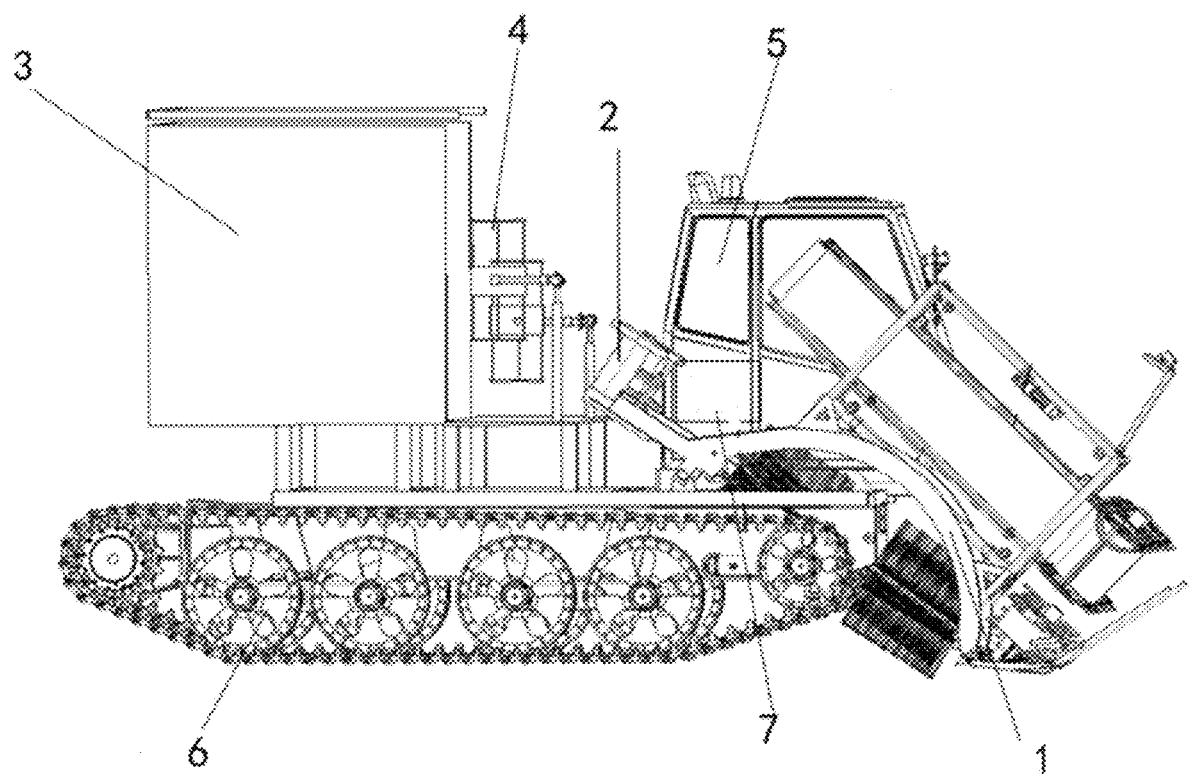
FIG. 1 is a schematic structural view of an efficient reed harvester according to an implementation of the present disclosure.
Figure 2:
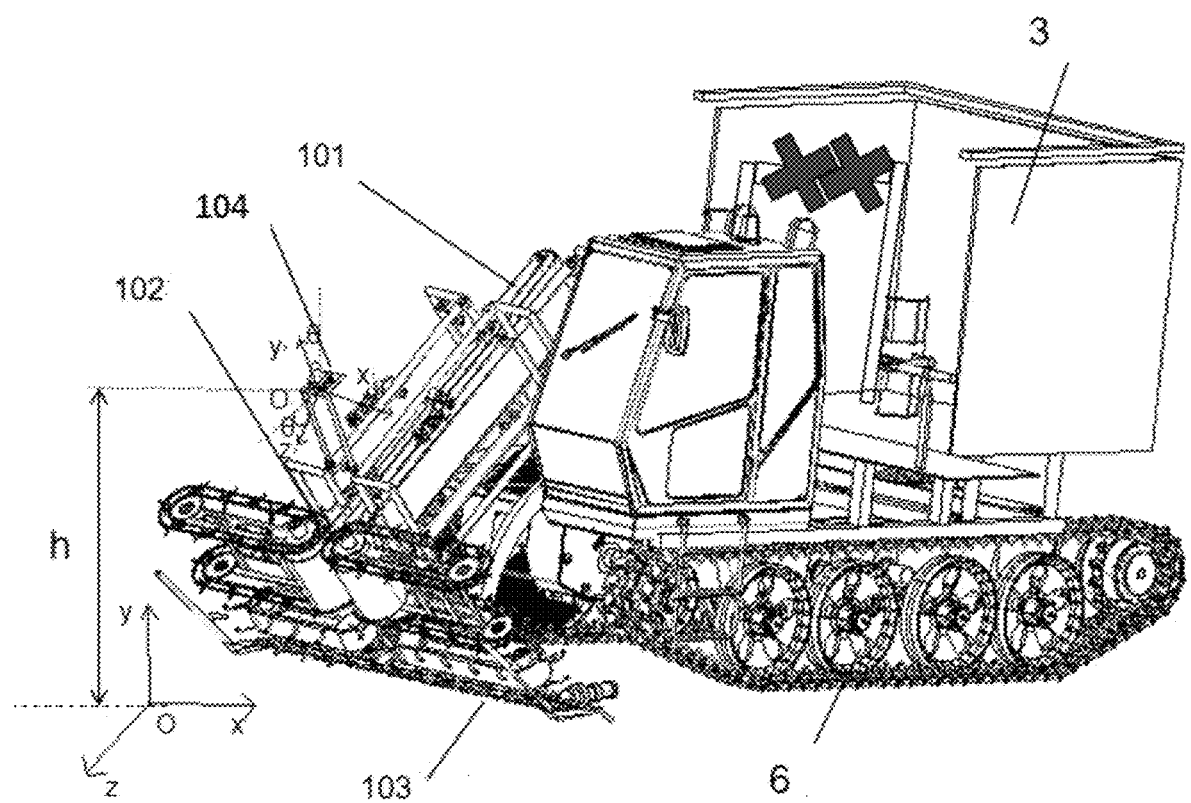
FIG. 2 is a schematic view of a coordinate according to an implementation of the present disclosure.

In the figures: 1: header, 2: knotter, 3: feed box, 4: stacking mechanism, 5: cab, 6: chassis, 7: control unit, 101: upstanding clamping longitudinal conveyor device, 102: transverse conveyor device, 103: knife, 104: laser radar, 105: clamping conveyor chain height adjustment mechanism, 106: root debris cleaning device, 107: root disc knife apparatus, 102-1: height sensor, 102-3: displacement sensor, 102-4: upper transverse conveyor mechanism, 102-5: intermediate transverse conveyor mechanism, 102-6: lower transverse conveyor mechanism, 102-7: short-side conveyor chain, 102-8: long-side conveyor chain, 102-9: short-side conveyor belt, 102-10: long-side conveyor belt, 102-11: driving sprocket, 102-12: driven sprocket, 102-13: conveyor chain strip, 102-14: inner chain plate, 102-15: feeding tooth, 102-16: support frame, 102-17: transverse conveyor device hydraulic cylinder set, 102-18: reed separating ring, 102-19: annular support arm, 102-20: upper hydraulic motor, 102-21: conveyor roller, 102-22: driving pulley, 102-23: driven pulley, 102-24: conveyor belt, 102-25: mounting seat, 102-26: feeding finger, 102-27: lower support frame, 102-28: lower support post, 102-29: support arm, 102-30: lower hydraulic motor, 103-1: knife height sensor, 105-1: speed reduction motor, 105-2: winch, 105-3: first pulley set, 105-4: second pulley set, 105-5: support, 105-6: sleeve, 105-7: wire rope, 105-8: rope-pull position sensor, 105-9: traction roller; 105-10: driven roller, 105-11: clamping conveyor chain, 105-12: upper beam, 105-13: lower beam, 106-1: brush, 106-2: rotating shaft, 106-3: motor, 107-1: disc knife device, 107-2: drive device, 107-3: height adjusting device, 107-4: vibration damping device, 107-1-1: disc knife, 107-1-2: knife rest, 107-2-1: pinion, 107-2-3: gear, 107-2-3: transmission pulley, 107-2-4: transmission belt, 107-2-5: hydraulic motor, 107-3-1: first side plate, 107-3-2: second side plate, 107-3-3: first height adjustment hydraulic cylinder, 107-3-4: second height adjustment hydraulic cylinder, 107-3-5: first height adjusting rod, 107-3-6: second height adjusting rod, 107-4-1: vibration absorber, 107-4-2: damping spring, 3: feed box, 301: rotating shaft, 302: feed box housing, 303: feed box door, 304: first wire clamp, 305: second wire clamp, 306: third wire clamp, 307: fourth wire clamp, 308: seventh drive mechanism, 309: eighth drive mechanism, 310: ninth drive mechanism, 311: tenth drive mechanism, 312: wire box, 313: eleventh drive mechanism, 314: steel wire, 315: twelfth drive mechanism, 316: groove, 401: first mechanical clamp, 402: second mechanical clamp, 403: first drive mechanism, 404: second drive mechanism,

405: third drive mechanism, 406: fourth drive mechanism, 407: fifth drive mechanism, 408: sixth drive mechanism, 409: first execution mechanism, and 410: second execution mechanism.

DETAILED DESCRIPTION OF THE EMBODIMENTS

The embodiments of the present disclosure are described below in detail. Examples of the embodiments are shown in the drawings. The same or similar numerals represent the same or similar elements or elements having the same or similar functions throughout the specification. The embodiments described below with reference to the drawings are illustrative for explaining the present disclosure and are not to be construed as limiting the present disclosure.

It should be understood that, in the description of the present disclosure, the terms such as "central", "longitudinal", "transverse", "length", "width", "thickness", "front", "rear", "left", "right", "upper", "lower", "axial", "circumferential", "vertical", "horizontal", "inner", and "outer" are intended to indicate orientations or positional relations shown in the drawings. It should be noted that these terms are merely intended to facilitate a simple description of the present disclosure, rather than to indicate or imply that the mentioned devices or elements must have the specific orientation or be constructed and operated in the specific orientation. Therefore, these terms may not be construed as a limitation to the present disclosure. In addition, the terms "first" and "second" are merely intended for a purpose of description, and shall not be understood as an indication or implication of relative importance or implicit indication of a quantity of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified and defined, meanings of terms "install", "connect with", "connect to" and "fixed to" should be understood in a broad sense. For example, the connection may be a fixed connection, a removable connection, or an integral connection; may be a mechanical connection or an electrical connection; may be a direct connection or an indirect connection via a medium; or may be intercommunication between two components. Those of ordinary skill in the art may understand specific meanings of the above terms in the present disclosure based on a specific situation.

FIG. 1 shows a preferred implementation of an efficient reed harvester provided by the present disclosure. The efficient reed harvester includes a preharvest detection unit, a cutting device, a conveyor device, a baling-stacking device, a chassis 6, and a control unit 7.

The preharvest detection unit, the cutting device, the conveyor device, the baling-stacking device, and the control unit 7 are provided on the chassis 6. The chassis 6 is a crawler chassis. The preharvest detection unit is configured to detect height information of reeds in a preharvest region, and transmit the height information to the control unit 7. The cutting device is configured to cut stems of the reeds. The conveyor device is configured to gather and clamp the stems of the reeds, and convey the stems backward to the baling-stacking device. The baling-stacking device is located behind the conveyor device, and configured to knot the reeds into small bales, stack the small bales of reeds vertically or horizontally, and knot the small bales of reeds into a big bale. The control unit 7 is connected to the preharvest detection unit, the cutting device, the conveyor device, and the baling-stacking device. The control unit 7 is configured to calculate an average height $h_{avg}$ of the reeds in the preharvest region according to the height information of the reeds in the preharvest region, and adjust a height of the conveyor device according to the average height of the reeds. The control unit 7 is configured to control the baling-stacking device to stack the small bales of reeds vertically or horizontally, and knot the small bales of reeds into the big bale.

The preharvest detection unit includes a laser radar 104. The laser radar 104 is configured to scan to-be-harvested reeds in front of a header 1 at a sampling interval T, acquire point cloud data for reflection points of the to-be-harvested reeds in a polar coordinate of the laser radar 104, and transmit the point cloud data to the control unit 7. The control unit 7 is configured to process the point cloud data to obtain a point cloud in a square region specified in front of the header 1, uniformly segment the square region into a plurality of sub-regions that are equal, calculate a maximum of a point cloud y coordinate in each of the plurality of sub-regions, take the maximum $y_{ijmax}$ as an average height of reeds in each of the plurality of sub-regions, and seek an average $y_{avg}$ in the square region according to the $y_{ijmax}$ representing the average height of the reeds in each of the plurality of sub-regions. The average represents the average height $h_{avg}$ of the reeds in the preharvest region.

By scanning and measuring the preharvest reeds with the laser radar 104 in real time, the present disclosure realizes contactless accurate measurement on heights of the reeds, and solves problems of poor accuracy and low efficiency of manual estimation with eyes.

Before detection with the laser radar 104, a coordinate of the laser radar 104 is set, specifically:

As shown in FIGS. 2-5, a laser radar base with an adjustable dip angle is provided on a top of the header 1 and at a height of h above the ground, the dip angle of the laser radar base is set as θ, and the laser radar 104 is provided on the laser radar base. An origin O' in the polar coordinate of the laser radar 104 has the height of h above the ground.

A geodetic coordinate system O(X, Y, Z) is established on the ground fittingly below the origin O' in the polar coordinate of the laser radar. A vertical distance from an origin O in the geodetic coordinate system to the origin O' in the polar coordinate of the laser radar is the height h.

With the origin O' in the polar coordinate of the laser radar as an origin, a rectangular coordinate system O'(X', Y', Z') is established along a direction for setting the dip angle θ. The rectangular coordinate system includes an X' axis having a same direction as an X axis of the geodetic coordinate system, a Y' axis forming an included angle of θ with a Y axis of the geodetic coordinate system, and a Z' axis forming an included angle of θ with a Z axis of the geodetic coordinate system.

The laser radar 104 scans the to-be-harvested reeds in front of the header 1 at the sampling interval T, acquires the point cloud data for the reflection points of the reeds in the polar coordinate of the laser radar 104, and transmits the point cloud data to the control unit 7. The cloud point data includes a radius, an elevation, an azimuth, and an intensity of each of the reflection points.

The control unit 7 performs coordinate transformation on the point cloud data, specifically:

The control unit 7 transforms the point cloud data into rectangular coordinate values in the rectangular coordinate system O'(X', Y', Z'), according to the radius, the elevation, and the azimuth of the reflection point in the point cloud, by:

$$\begin{cases} X' = \text{radius} \cdot \cos(\text{evelation}) \cdot \cos(\text{azimuth}) \\ Y' = \text{radius} \cdot \cos(\text{evelation}) \cdot \sin(\text{azimuth}) \\ Z' = \text{radius} \cdot \sin(\text{evelation}) \end{cases}$$

where, X', Y', and Z' are respectively three coordinate axes in the rectangular coordinate system O'.

The control unit transforms the rectangular coordinate values of the point cloud in the rectangular coordinate system O'(X', Y', Z') into coordinate values in the geodetic coordinate system O(X, Y, Z) by:

$$\begin{cases} X' = X' \\ Y' = Y' \cdot \cos\theta + h \\ Z' = Z' \cdot \sin\theta \end{cases}$$

where, X, Y, and Z are respectively three coordinate axes in the geodetic coordinate system O.

Figure 3:
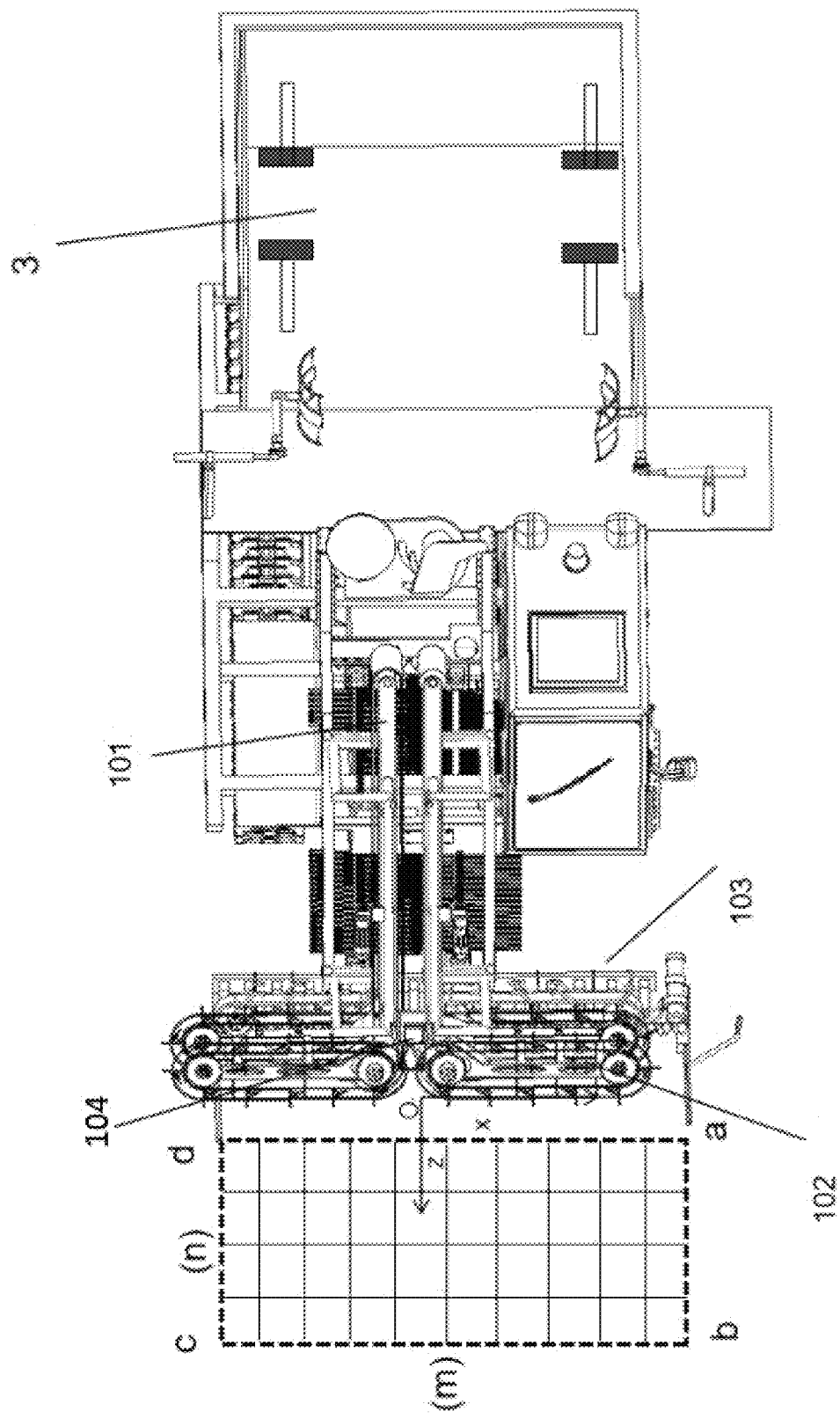
FIG. 3 is a schematic view for processing point cloud data according to an implementation of the present disclosure.

As shown in FIG. 3, the control unit 7 processes the point cloud data to calculate the average height of the reeds in the preharvest region, specifically:

The control unit 7 processes the point cloud data, filters out a noise point (an outlier) in the point cloud with a Statistical Outlier Removal filter, filters out a point cloud out of the square region abcd specified in front of the header 1 with a pass-through filter, and retains the point cloud in the square region abcd. The point cloud in the square region reflects biological plant heights of the reeds in front of the header.

The square region abcd is uniformly segmented into m×n sub-regions that are equal. The maximum of the point cloud y coordinate in each of the sub-regions is calculated. The maximum $y_{ijmax}$ is taken as the average height of the reeds in the sub-region. In case of more enough m×n sub-regions that are equal, an error arising from the $y_{ijmax}$ representing the average height of the reeds in each sub-region falls within an acceptable range.

Figure 4:
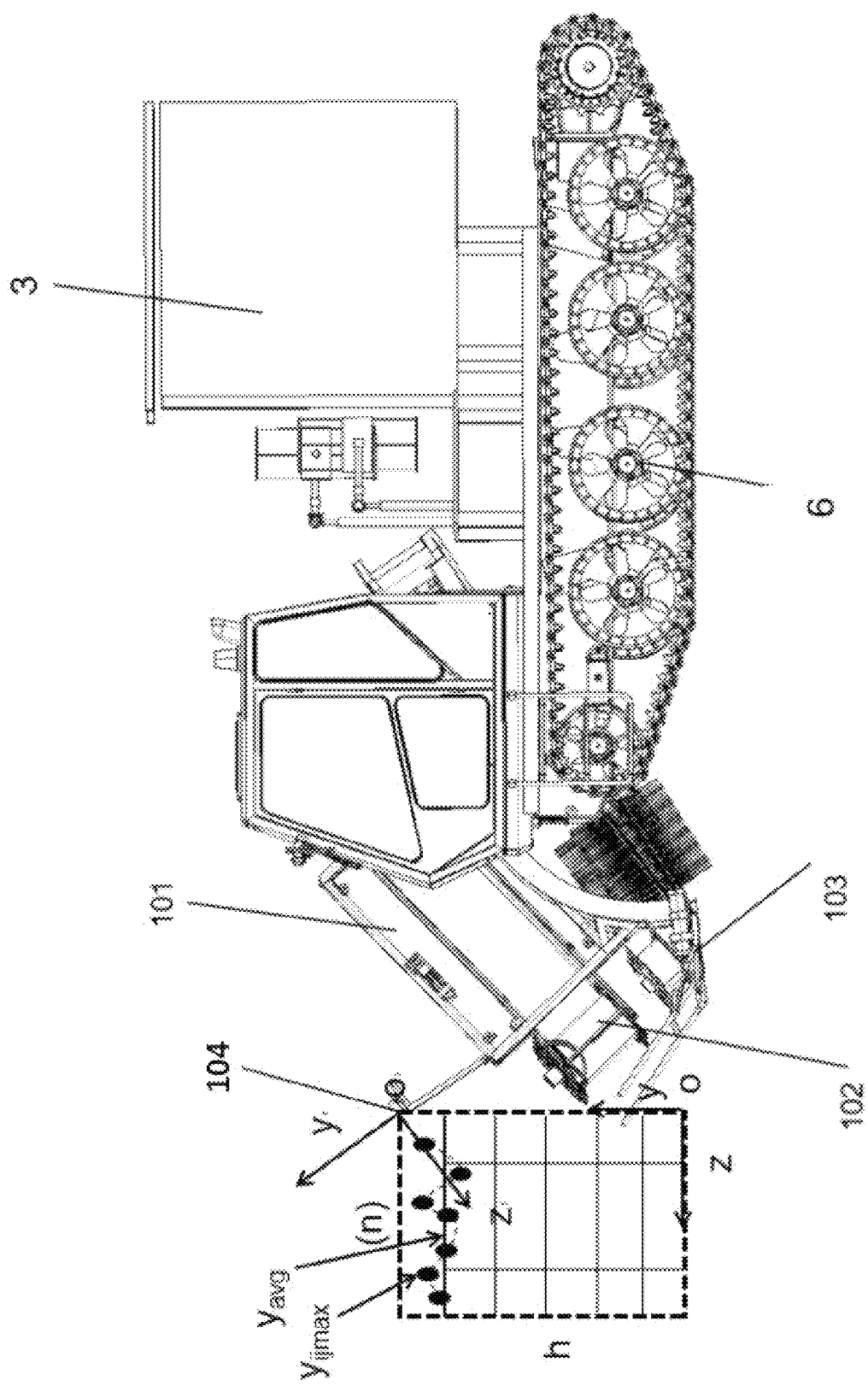
FIG. 4 is a schematic view for fitting an average height of reeds according to an implementation of the present disclosure.
Figure 5:
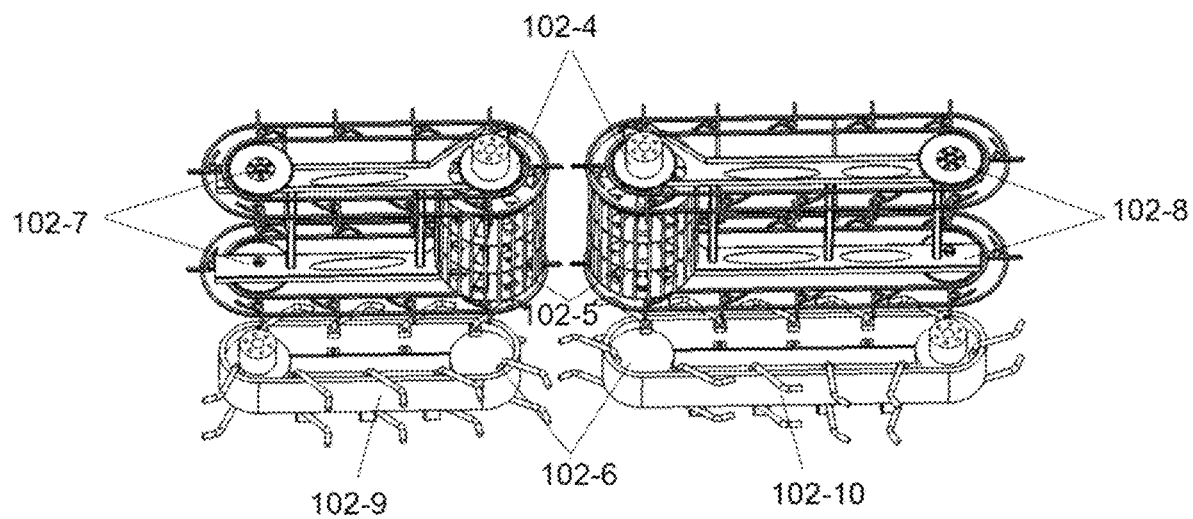
FIG. 5 is a schematic structural view of a transverse conveyor device according to an implementation of the present disclosure.

The average $y_{avg}$ in the square region is sought according to the $y_{ijmax}$ representing the average height of the reeds in each of the sub-regions. The average represents the average height $h_{avg}$ of the reeds in the preharvest region, as shown in FIG. 4.

The conveyor device includes an upstanding clamping longitudinal conveyor device 101 and a transverse conveyor device 102. The upstanding clamping longitudinal conveyor device 101 is provided behind the transverse conveyor device 102. The transverse conveyor device 102 is configured to gather the reeds at two sides to a middle and convey the reeds to the upstanding clamping longitudinal conveyor device 101. The upstanding clamping longitudinal conveyor device 101 is configured to clamp the stems of the reeds and convey the stems backward to the baling-stacking device.

As shown in FIGS. 5-9, the transverse conveyor device 102 includes an upper transverse conveyor mechanism 102-4, an intermediate transverse conveyor mechanism 102-5, a lower transverse conveyor mechanism 102-6, a height sensor 102-1, a transverse conveyor device hydraulic cylinder set 102-17, a displacement sensor 102-3, and the control unit. The upper transverse conveyor mechanism 102-4 is provided uppermost. A plurality of feeding teeth 102-15 are arranged on the upper transverse conveyor mechanism 102-4. The upper transverse conveyor mechanism 102-4 is configured to gather and clamp top portions of the stems of the reeds and feed the top portions. The intermediate transverse conveyor mechanism 102-5 is provided under the upper transverse conveyor mechanism 102-4. A plurality of feeding teeth 102-15 are arranged on the intermediate transverse conveyor mechanism 102-5. The intermediate transverse conveyor mechanism 102-5 is configured to gather and clamp intermediate portions of the stems of the reeds and feed the intermediate portions. The lower transverse conveyor mechanism 102-6 is provided under the intermediate transverse conveyor mechanism 102-5. The lower transverse conveyor mechanism 102-6 is provided with a plurality of feeding fingers 102-26. The lower transverse conveyor mechanism 102-6 is configured to gather and clamp bottom portions of the stems of the reeds and feed the bottom portions. The upper transverse conveyor mechanism 102-4, the intermediate transverse conveyor mechanism 102-5, and the lower transverse conveyor mechanism 102-6 each include a short side and a long side. The height sensor 102-1 is provided on the intermediate transverse conveyor mechanism 102-5, and configured to detect a height of the intermediate transverse conveyor mechanism 102-5. The transverse conveyor device hydraulic cylinder set 102-17 is provided between the upper transverse conveyor mechanism 102-4 and the intermediate transverse conveyor mechanism 102-5, and configured to control a distance between the upper transverse conveyor mechanism 102-4 and the intermediate transverse conveyor mechanism 102-5. The displacement sensor 102-3 is configured to detect an amount of expansion and contraction of the transverse conveyor device hydraulic cylinder set 102-17. The control unit is connected to the height sensor 102-1, the transverse conveyor device hydraulic cylinder set 102-17, and the displacement sensor 102-3, and configured to adjust the height of the intermediate transverse conveyor mechanism 102-5 through the transverse conveyor device hydraulic cylinder set 102-17 according to detection information of the height sensor 102-1 and the displacement sensor 102-3.

Figure 6:
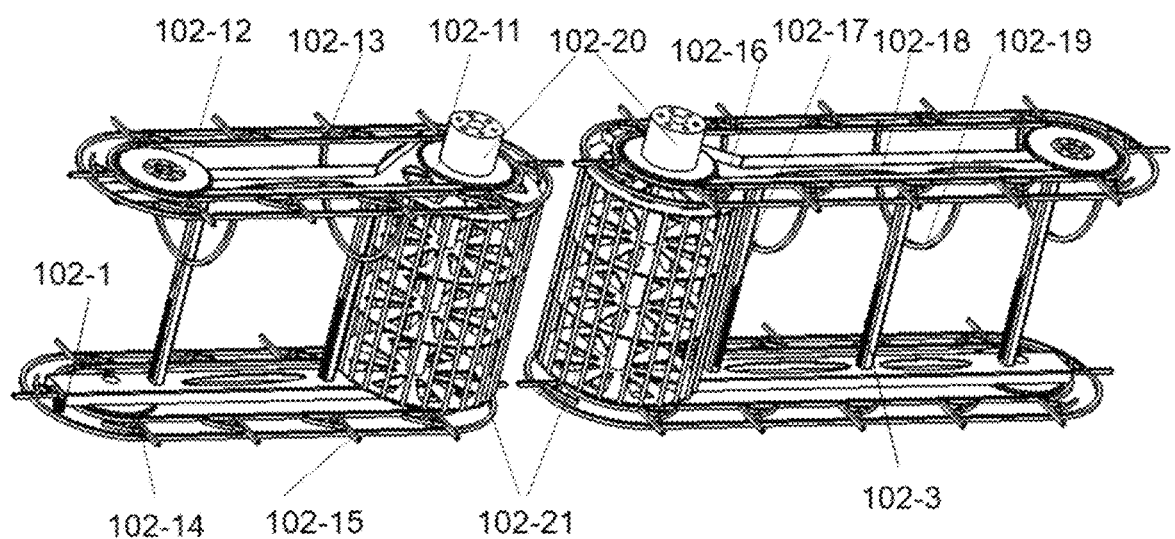
FIG. 6 is a schematic structural view of an upper transverse conveyor mechanism and an intermediate transverse conveyor mechanism according to an implementation of the present disclosure.

As shown in FIG. 6, the upper transverse conveyor mechanism 102-4 and the intermediate transverse conveyor mechanism 102-5 are structurally the same, and each include transverse conveyor units opposite to each other. A conveyor roller 102-21 is provided between the upper transverse conveyor mechanism 102-4 and the intermediate transverse conveyor mechanism 102-5. A belt is provided on the conveyor roller 102-21. The transverse conveyor units opposite to each other each include a first conveyor chain and a second conveyor chain. A rotating direction of a conveyor chain strip 102-13 of the first conveyor chain is opposite to a rotating direction of a conveyor chain strip of the second conveyor chain. Preferably, the first conveyor chain is a short-side conveyor chain 102-7, and the second conveyor chain is a long-side conveyor chain 102-8. The short-side conveyor chain 102-7 and the long-side conveyor chain 102-8 each include a driving sprocket 102-11, a driven sprocket 102-12, the conveyor chain strip 102-13, an inner chain plate 102-14, a plurality of feeding teeth 102-15, a support frame 102-16, a reed separating ring 102-18, and an annular support arm 102-19. The driving sprocket 102-11 and the driven sprocket 102-12 are provided on the support frame 102-16. The conveyor chain strip 102-13 is provided on the driving sprocket 102-11 and the driven sprocket 102-12. The inner chain plate 102-14 is provided on the conveyor chain strip 102-13. The transverse conveyor device hydraulic cylinder set 102-17 is provided under the support frame 102-16. The plurality of feeding teeth 102-15 are uniformly arranged on the inner chain plate 102-14. The annular support arm 102-19 includes a top connected to the reed separating ring 102-18, and a bottom connected to the transverse conveyor device hydraulic cylinder set 102-17. The reed separating ring 102-18 is provided at a periphery of the conveyor chain strip 102-13.

According to the embodiment, preferably, the short-side conveyor chain 102-7 and the long-side conveyor chain 102-8 are arranged along a straight line, with a gap therebetween. The conveyor chain strip 102-13 of the short-side conveyor chain and the conveyor chain strip of the long-side conveyor chain are opposite to each other in the rotating direction, and configured to feed the stems of the reeds to the gap therebetween from two sides. In order to ensure that a feeding range of the upper transverse conveyor mechanism 102-4 and a feeding range of the intermediate transverse conveyor mechanism 102-5 are consistent with a swath of the header of the harvester (if not, the harvester can only realize single-sided harvesting), the short-side conveyor chain 102-7 must be provided at a same side with a cab of the harvester.

Figure 9:
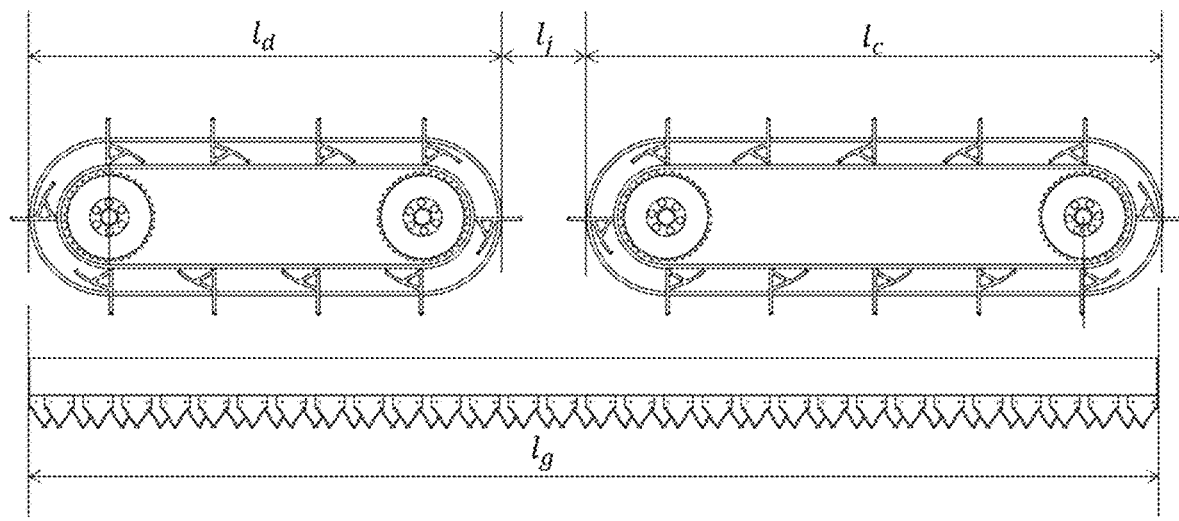
FIG. 9 is a diagram for analyzing a length of a transverse conveyor device according to an implementation of the present disclosure.

As shown in FIG. 9, a length of the short-side conveyor chain 102-7 and a length of the long-side conveyor chain 102-8 meet the following conditions:

$$l_d + l_j + l_c \geq l_g$$

where, $l_c$ represents the length of the long-side conveyor chain 102-8;

$l_d$ represents the length of the short-side conveyor chain 102-7;

$l_j$ represents the conveying gap between the short-side conveyor chain 102-7 and the long-side conveyor chain 102-8; and $l_g$ represents the swath of the header of the harvester.

According to the embodiment, preferably, a plurality of circumferentially-arranged threaded rods are provided on the conveyor roller 102-21, and configured to increase a force of friction of the conveyor roller 102-21 with the belt. The conveyor roller 102-21 is connected to the upper hydraulic motor 102-20.

Both the upper transverse conveyor mechanism 102-4 and the intermediate transverse conveyor mechanism 102-5 are connected to the conveyor roller 102-21. The upper hydraulic motor 102-20 drives the conveyor roller 102-21 to rotate. The conveyor roller 102-21 drives the conveyor chain strip 102-13 of the upper transverse conveyor mechanism 102-4 and the conveyor chain strip of the intermediate transverse conveyor mechanism 102-5 to rotate synchronously.

The upper hydraulic motor 102-20 provides power for the upper transverse conveyor mechanism 102-4 and the intermediate transverse conveyor mechanism 102-5, and transmits the power to the conveyor roller 102-21. The conveyor roller 102-21 in rotation drives the upper transverse conveyor mechanism 102-4 and the intermediate transverse conveyor mechanism 102-5 to move.

Figure 7A:
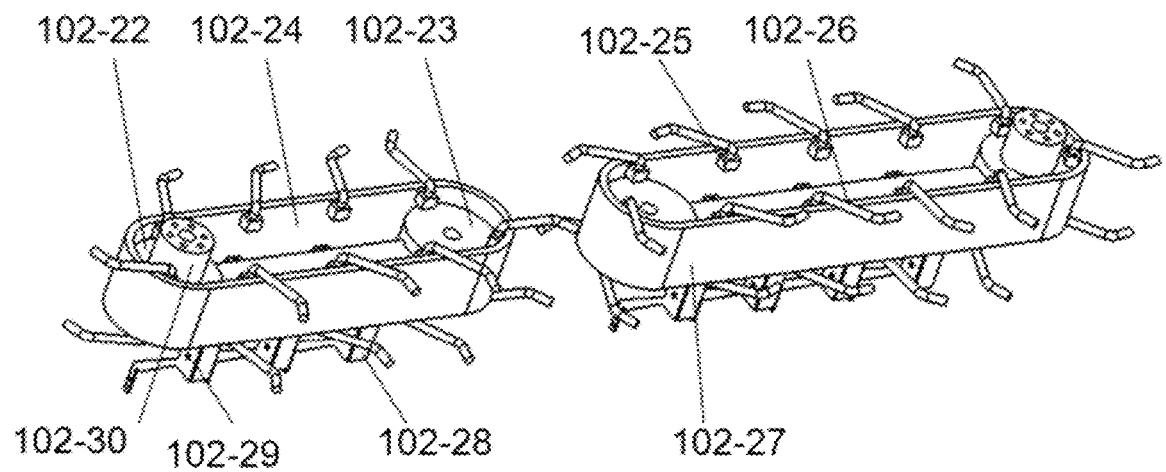
Figure 7B:
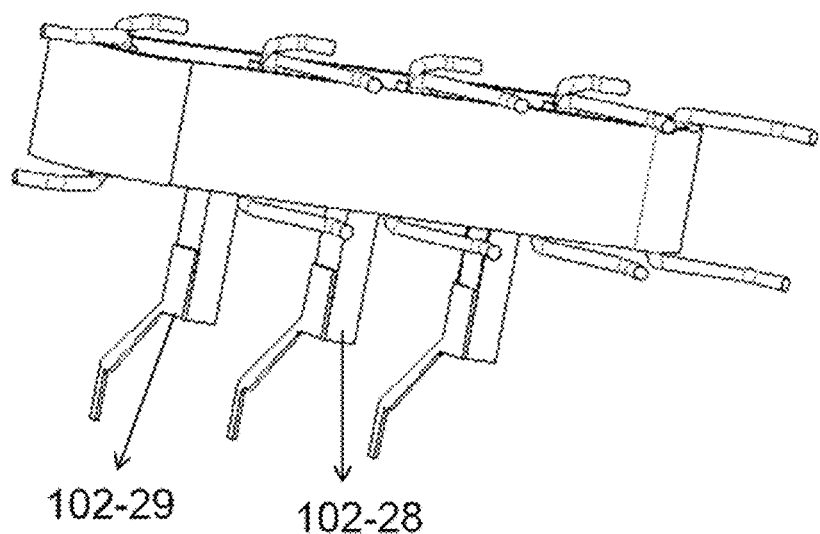

As shown in FIGS. 7A-7C, the lower transverse conveyor mechanism 102-6 has a fixed mounting position, and is provided on a bottom frame of the harvester through a support arm 102-29. A height of the upper transverse conveyor mechanism 102-4 and a height of the intermediate transverse conveyor mechanism 102-5 can be adjusted through the transverse conveyor device hydraulic cylinder set 102-17 and the conveyor roller 102-21 according to a height of a stem of a harvested reed.

According to the embodiment, preferably, the conveyor roller 102-21 is connected to the driving sprocket 102-11 through a bearing, and configured to drive the short-side conveyor chain and the long-side conveyor chain to move. The driven sprocket 102-12 is provided on the support frame 102-16 through a bolt. The driving sprocket 102-11 and the driven sprocket 102-12 are respectively provided at two sides of the conveyor chain. The conveyor roller 102-21 takes a guiding action for a conveyance path of the reeds, and gathers the reeds at two sides to a middle.

According to the embodiment, preferably, the support frame 102-16 may be provided on a harvester frame through a bolt, and configured to support the short-side conveyor chain 102-7 and the long-side conveyor chain 102-8. This prevents deformation of the short-side conveyor chain 102-7 and the long-side conveyor chain 102-8 in reed stem conveyance. In view of a light weight and an aesthetically pleasing design, the support frame 102-16 is machined by a sheet metal part, with a plurality of through holes.

According to the embodiment, preferably, the reed separating ring 102-18 is provided on the transverse conveyor device hydraulic cylinder set 102-17 through the annular support arm 102-19. This prevents the stems of the reeds from directly entering the conveyor chain strip 102-13 to make the conveyor mechanism stuck. Meanwhile, this can also support the upper feeding teeth 102-15, and prevent deformation of the support frame 102-16 caused by falling of the feeding teeth.

According to the embodiment, preferably, the transverse conveyor device hydraulic cylinder set 102-17 is provided between the upper transverse conveyor mechanism 102-4 and the intermediate transverse conveyor mechanism 102-5. This can increase a strength of the support frame of the upper conveyor mechanism and a strength of the support frame of the lower conveyor mechanism, prevent the upper transverse conveyor mechanism 102-4 and the intermediate transverse conveyor mechanism 102-5 from inclining toward one side of the driven sprocket 102-12 as a whole, and can further adjust a height of the intermediate conveyor device. In view of the light weight and the aesthetically pleasing design, only necessary driving shaft and outer diameter of the conveyor roller 102-21 are kept, while a remaining portion of the conveyor roller may be hollow.

When the three transverse conveyor mechanisms convey the stems of the reeds to a vicinity of the conveyor roller 102-21, the belt on the conveyor roller 102-21 can facilitate the conveyance of the stems, thereby improving stem conveyance efficiency. A diameter of the conveyor roller 102-21 is mainly determined by an angle $\beta$ of friction with the reed, namely the diameter of the conveyor roller 102-21 meets the following relationship:

$$\beta \geq \arccos \frac{D}{D+d}$$

where, $\beta$ represents an angle of friction between the stem of the reed and the subsequent clamping conveyor belt;

D represents the outer diameter of the roller; and d represents a diameter of the stem of the reeds.

As shown in FIG. 7A and FIG. 7B, the lower transverse conveyor mechanism 102-6 includes lower transverse conveyor units opposite to each other. The lower transverse conveyor units opposite to each other each include a short-side conveyor belt 102-9 and a long-side conveyor belt 102-10. The short-side conveyor belt 102-9 and the long-side conveyor belt 102-10 each include a driving pulley 102-22, a driven pulley 102-23, a conveyor belt 102-24, a plurality of mounting seats 102-25, a plurality of feeding finger 102-26, a lower support frame 102-27, a lower support post 102-28, a support arm 102-29, and a lower hydraulic motor 102-30. The support arm 102-29 is provided on a harvester frame. The lower support post 102-28 is provided on the support arm 102-29. The lower support frame 102-27 is provided on the lower support post 102-28. The driving pulley 102-22 and the driven pulley 102-23 are provided on the lower support frame 102-27. The driving pulley 102-22 is connected to the lower hydraulic motor 102-30. The lower hydraulic motor 102-30 is configured to provide power for the lower transverse conveyor mechanism 102-6, and transmit the power to the driving pulley 102-22.

The conveyor belt 102-24 is provided on the driving pulley 102-22 and the driven pulley 102-23. The plurality of mounting seats 102-25 are uniformly arranged on the conveyor belt 102-24. The plurality of feeding fingers 102-26 are respectively provided on the plurality of mounting seats 102-25.

According to the embodiment, preferably, the lower support frame 102-27 is provided between the short-side conveyor belt 102-9 and the long-side conveyor belt 102-10, and configured to support the lower transverse conveyor mechanism 102-6. The lower support post 102-28 is welded on the lower support frame 102-27, and connected to the support arm 102-29 through a bolt. The support arm 102-29 may be connected to the harvester frame through a bolt, and configured to support the lower support frame 102-27.

According to the embodiment, preferably, in work, the feeding fingers 102-26 move along a movement path of the conveyor belt, thereby feeding the roots of the stems to a middle from two sides. Meanwhile, the feeding fingers 102-26 at a lower side are configured to support stems of lodged reeds for their low mounting positions. A number of the feeding fingers 102-26 is required to cover stems of to-be-harvested reeds, so as to ensure that stems of the cut reeds are gathered, clamped and conveyed by the lower feeding teeth completely without omission. The number q of the feeding fingers 102-26 meets the following condition:

$$q = vtl\rho$$

where, q represents the number of the feeding fingers provided on the conveyor belt;
v represents a speed of advance of the harvester;
t represents a single harvesting cycle;
l represents a swath of the header of the harvester; and
ρ represents a growth density of the to-be-harvested reeds.

Figure 8:
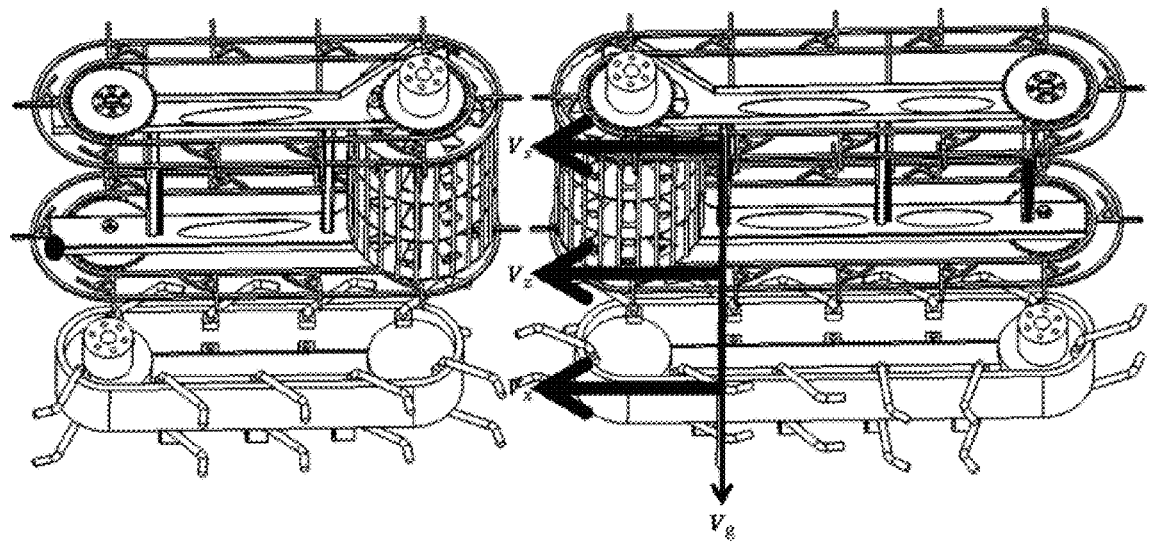
FIG. 8 is a diagram for analyzing a speed in a reed conveyance process according to an implementation of the present disclosure.

As shown in FIG. 8, a conveying speed of the upper transverse conveyor mechanism 102-4, a conveying speed of the intermediate transverse conveyor mechanism 102-5, and a conveying speed of the lower transverse conveyor mechanism 102-6 meet the following condition:

$$V_x > V_g$$
$$V_z > V_g$$
$$V_s > V_g$$

where, $V_s$ represents a conveying speed of the feeding teeth 102-15 of the upper transverse conveyor mechanism 102-4;
$V_z$ represents a conveying speed of the feeding teeth 102-15 of the intermediate transverse conveyor mechanism 102-5;
$V_x$ represents a conveying speed of the feeding fingers 102-26 of the lower transverse conveyor mechanism 102-6; and
$V_g$ represents a component of a falling speed of the stems of the cut reeds in a vertical direction.

According to the embodiment, preferably, the feeding teeth 102-15 of the upper transverse conveyor mechanism 102-4 and the feeding teeth of the intermediate transverse conveyor mechanism 102-5 are provided on the inner chain plate 102-14 of the conveyor chain strip through a bolt, and configured to collect, clamp, and convey the stems of the reeds. In work, the feeding fingers 102-15 moves along a movement path of the conveyor chain strip 102-13, thereby feeding stems on a top and a middle of the reed separating ring 102-18 to a middle from two sides. A number of the feeding fingers 102-15 is required to cover the stems of the to-be-harvested reeds, so as to ensure that stems of cut reeds are gathered, clamped and conveyed by the feeding teeth 102-15 completely without omission. The number q of the feeding teeth meets the following condition:

$$q = vtl\rho$$

where, q represents the number of the feeding teeth 102-5;
v represents a speed of advance of the harvester;
t represents a single harvesting cycle;
l represents the swath of the header of the harvester; and
p represents a growth density of the to-be-harvested reeds.

Figure 10:
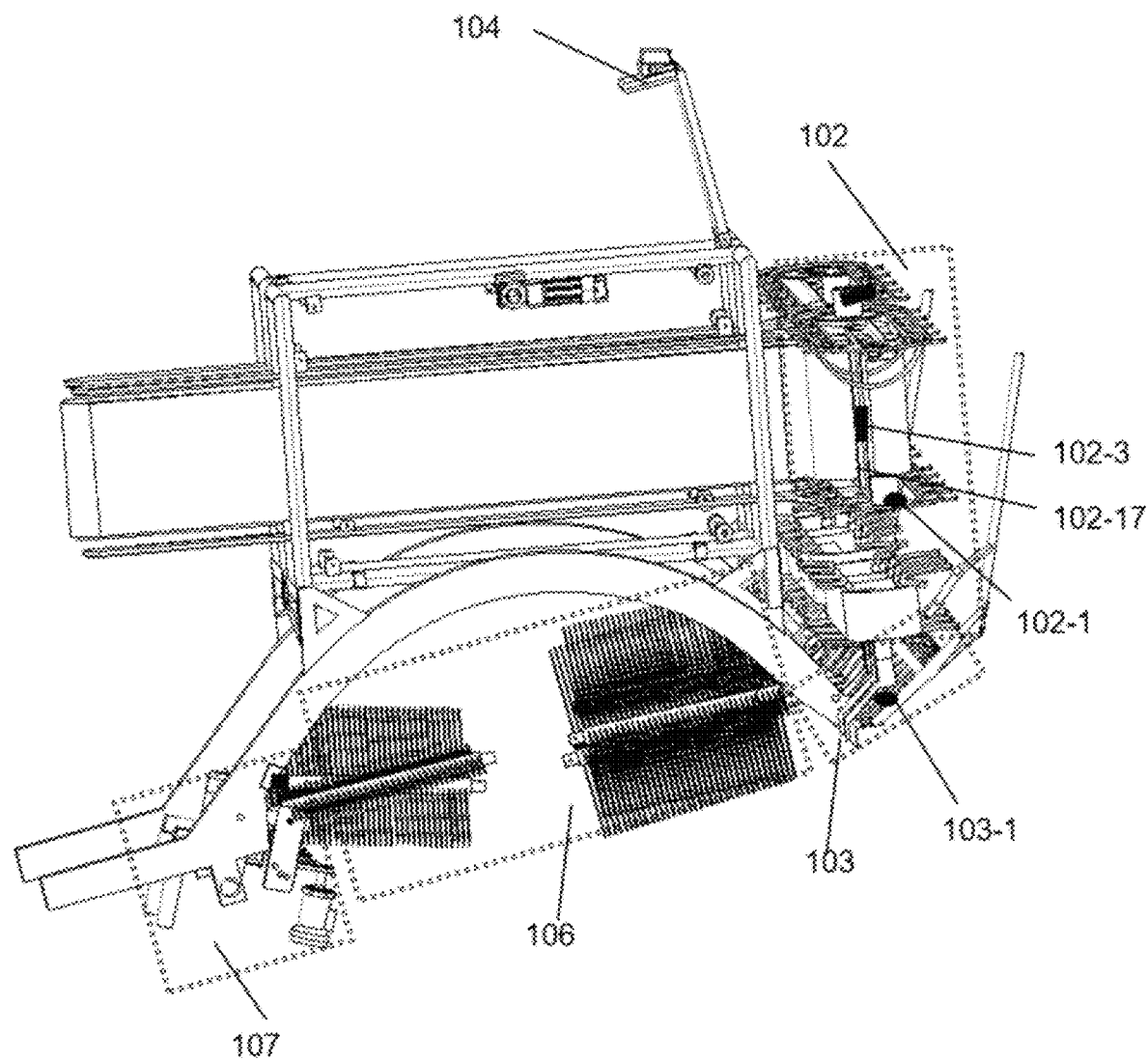
FIG. 10 is a schematic structural view of a conveyor device according to an implementation of the present disclosure.

As shown in FIG. 10, the transverse conveyor device 102 further includes a knife height sensor 103-1. The knife height sensor 103-1 is connected to the control unit. The laser radar 104 is configured to detect heights of preharvest reeds, and transmit the heights to the control unit. The control unit is configured to calculate an average height have of the reeds. The knife height sensor 103-1 is configured to detect a height $h_1$ of a knife 103 above the ground, and transmit the height h; to the control unit.

Figure 11:
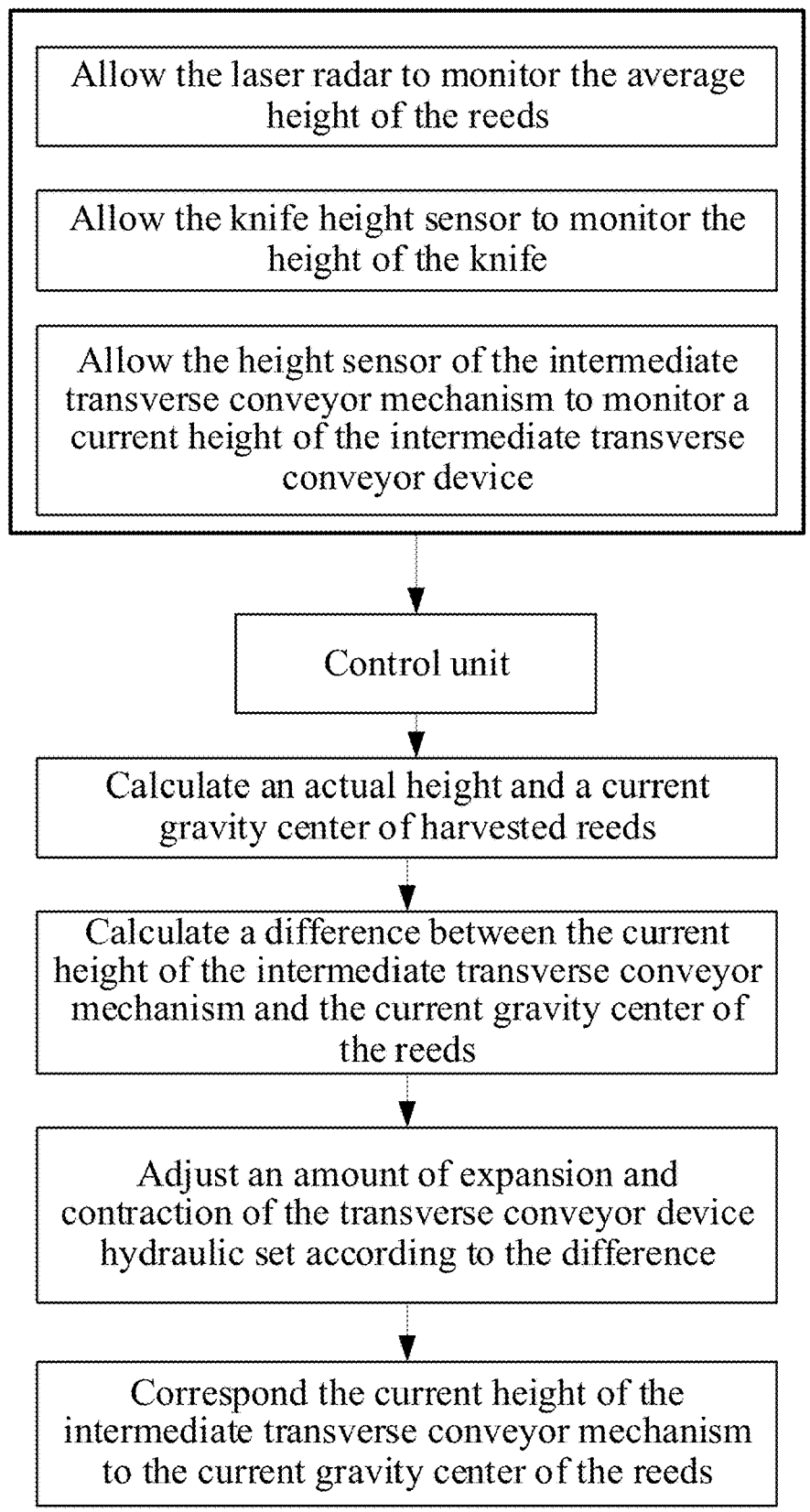
FIG. 11 is a flowchart for height adjustment on an intermediate transverse conveyor mechanism according to an implementation of the present disclosure.

As shown in FIG. 11, the control unit is configured to calculate an actual length $h_2 = h_{avg} - h_1$ of a harvested reed according to the average height $h_{avg}$ of the reeds and the height $h_1$ $$\frac{2h_2}{3}$$

of the knife above the ground to obtain an actual height and a current gravity center of the harvested reed, calculate a difference between a current height of the intermediate transverse conveyor mechanism and the current gravity center of the harvested reed according to detection information of the height sensor 102-1 and the displacement sensor 102-3, adjust an amount of expansion and contraction of the transverse conveyor device hydraulic cylinder set 102-17 according to the difference, and correspond the current height of the intermediate transverse conveyor mechanism 102-5 to the current gravity center of the reeds, namely the actual length $$\frac{2h_2}{3},$$

for feeding.

The upper transverse conveyor mechanism, the intermediate transverse conveyor mechanism, and the lower transverse conveyor mechanism are provided. The upper transverse conveyor mechanism, the intermediate transverse conveyor mechanism, and the lower transverse conveyor mechanism each are provided with the feeding fingers or feeding teeth. The present disclosure can cope with stress imbalance caused by high stems of the reeds, and lodging of the reeds in a mature period, can convey the reeds more easily, and facilitates effective cutting. Meanwhile, the laser radar 104, the knife height sensor 103-1, and the height sensor 102-1 are used to respectively acquire the height of the reed, the height of the knife, and the height of the transverse conveyor mechanism.

The present disclosure can automatically adjust the height of the transverse conveyor mechanism, ensure that the gravity center of the fed reed is stressed, and prevent the stem of the reed from breaking at a middle due to stress imbalance. The present disclosure can realize tide and sequential transverse conveyance of the reed, and improves conveyance efficiency of the harvester.

Figure 12:
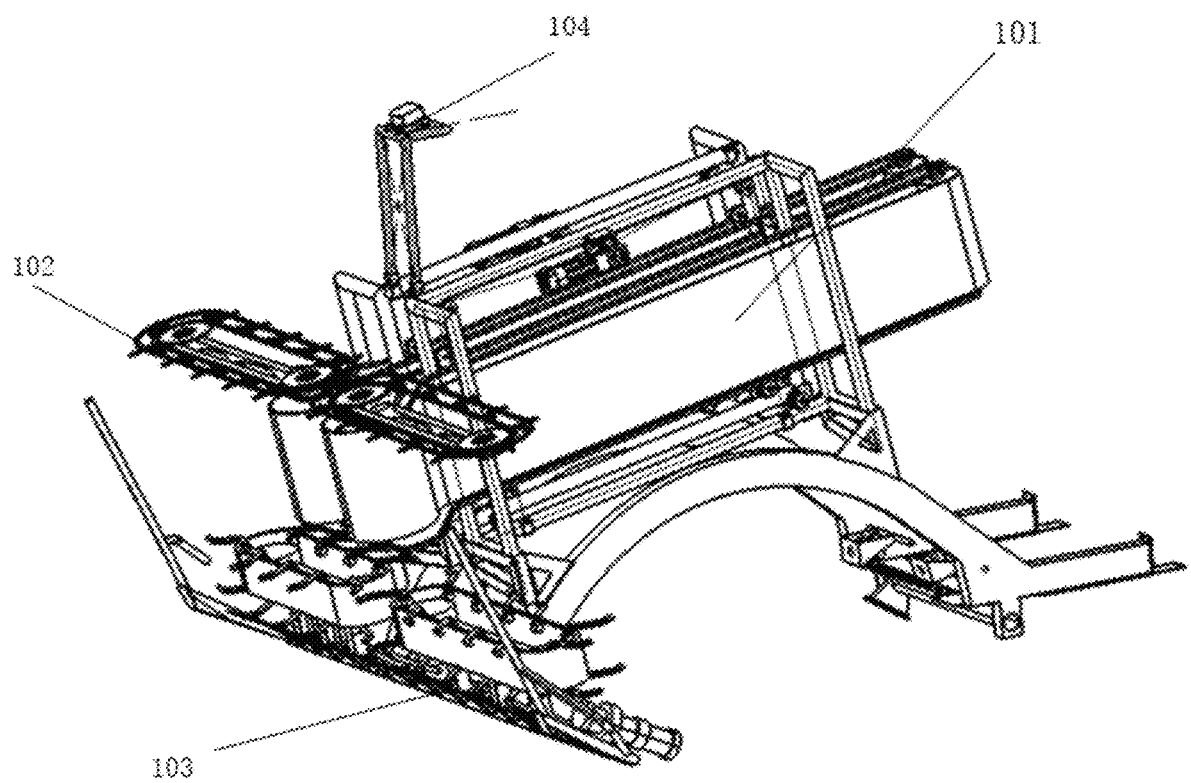
FIG. 12 is a schematic structural view of an upstanding clamping longitudinal conveyor device according to an implementation of the present disclosure.
Figure 13:
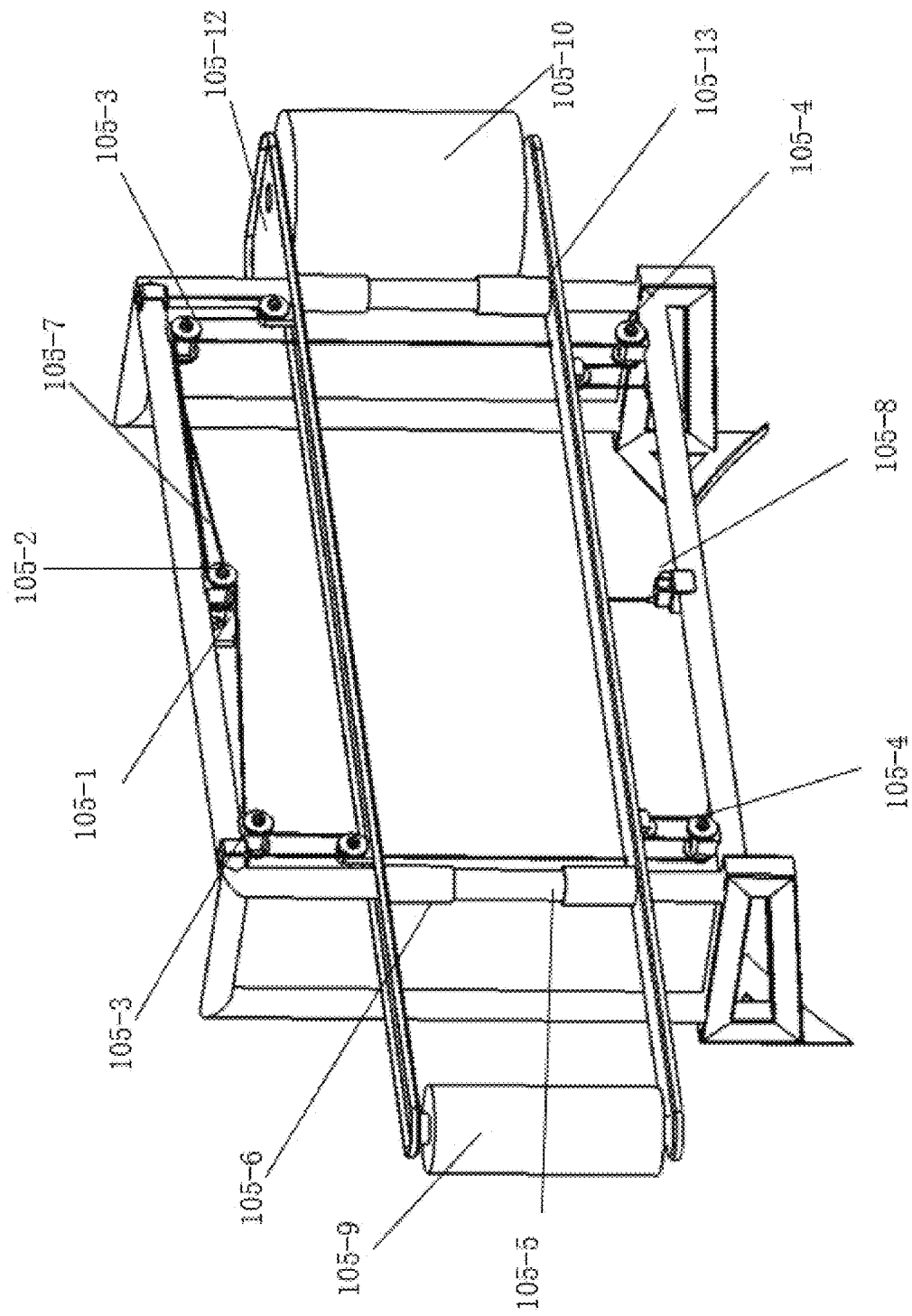
FIG. 13 is a schematic structural view of an upstanding conveyor unit according to an implementation of the present disclosure.

As shown in FIG. 12 and FIG. 13, in an implementation of the present disclosure, the upstanding clamping longitudinal conveyor device 101 includes two symmetric upstanding longitudinal conveyor mechanisms and a clamping conveyor chain height adjustment mechanism 105. The clamping conveyor chain height adjustment mechanism 105 includes a position sensor and a lifting device. The position sensor is configured to detect a current height of the two symmetric upstanding longitudinal conveyor mechanisms, and transmit the current height to the control unit 7. The lifting device is connected to the two symmetric upstanding longitudinal conveyor mechanisms. The control unit 7 is connected to the lifting device. The control unit 7 is configured to calculate a height of a gravity center of the reeds according to the average height $h_{avg}$ of the reeds in the preharvest region, seek a height difference between the height of the gravity center of the reeds and the current height of the two symmetric upstanding longitudinal conveyor mechanisms, and control, according to the height difference, the lifting device to adjust a height of the two symmetric upstanding longitudinal conveyor mechanisms to correspond to the gravity center of the reeds in the preharvest region. The present disclosure can make the clamping conveyor chain 105-11 adapted for different heights of the reeds through height adjustment, and can clamp the reeds reliably and tidily for conveyance, thereby greatly improving tidiness of the reeds in the reed conveyance, and being more convenient for bale knotting of the reeds.

As shown in FIG. 13, the lifting device includes a speed reduction motor 105-1, a coupled twin winch 105-2, a first pulley set 105-3, a second pulley set 105-4, a support 105-5, and a sleeve 105-6. The support 105-5 is provided at two sides of the upstanding clamping longitudinal conveyor device 101. The support 105-5 is connected to a girder of the header 1. The upstanding clamping longitudinal conveyor device 101 is connected to a vertical beam of the support 105-5 through the sleeve 105-6. The upstanding clamping longitudinal conveyor device 101 can move up and down along the vertical beam of the support 105-5 for position adjustment. The speed reduction motor 105-1 and the coupled twin winch 105-2 are provided on a top of the support 105-5. The first pulley set 105-3 is provided at two sides of an upper portion of the support 105-5, connected to an upper portion of the upstanding clamping longitudinal conveyor device 101, and configured to move up the upstanding clamping longitudinal conveyor device 101. The second pulley set 105-4 is provided at two sides of a lower portion of the support 105-5, connected to a lower portion of the upstanding clamping longitudinal conveyor device 101, and configured to move down the upstanding clamping longitudinal conveyor device 101. A wire rope 105-7 of the first pulley set 105-3 and of the second pulley set 105-4 is connected to the coupled twin winch 105-2. The coupled twin winch 105-2 driven by the speed reduction motor 105-1 drives the wire rope to realize retraction and release of the wire rope, thereby driving the upstanding clamping longitudinal conveyor device 101 to move up and down along the vertical beam of the support 105-5.

Preferably, the coupled twin winch 105-2 includes two winches. The two winches rotate together with a motor shaft. The coupled twin winch driven by a single machine shaft drives the wire rope 105-7 to realize retraction and release of the wire rope 105-7, thereby driving the upstanding clamping longitudinal conveyor unit to move up and down.

As shown in FIG. 12 and FIG. 13, the upstanding clamping longitudinal conveyor device 101 includes two symmetric upstanding longitudinal conveyor mechanisms. The two symmetric upstanding longitudinal conveyor mechanisms clamp an upstanding reed when longitudinally conveying the reeds.

The two symmetric upstanding longitudinal conveyor mechanisms each include an upstanding conveyor unit and a sleeve 105-6. As shown in FIG. 13, the upstanding conveyor unit includes a traction roller 105-9, a driven roller, a clamping conveyor chain 105-11, an upper beam 105-12, and a lower beam 105-13. The upper beam 105-12 is located above the lower beam 105-13. The traction roller 105-9 includes one end connected to one end of the upper beam 105-12, and the other end connected to one end of the lower beam 105-13. The conveyor roller 102-21 serves as the driven roller. The driven roller includes one end connected to the other end of the upper beam 105-12, and the other end connected to the other end of the lower beam 105-13. The clamping conveyor chain 105-11 surrounds the traction roller 105-9 and the driven roller. The upper beam 105-12 and the lower beam 105-13 are connected to the sleeve 105-6. The sleeve 105-6 is provided on the vertical beam of the support 105-5. The sleeve 105-6 is slidable up and down along the vertical beam of the support 105-5, thereby driving the upstanding conveyor unit to move up and down.

In an implementation of the present disclosure, preferably, the first pulley set 105-3 includes at least four pulleys, in which two pulleys are respectively provided at the two sides of the upper portion of the support 105-5, and remaining two pulleys are respectively located at the two sides of the upper portion of the support 105-5, connected to the upper beam 105-12 of the upstanding clamping longitudinal conveyor device 101, and configured to move up the upstanding clamping longitudinal conveyor device 101. The second pulley set 105-4 includes at least four pulleys, in which two pulleys are respectively provided at the two sides of the lower portion of the support 105-5, and remaining two pulleys are respectively located at the two sides of the lower portion of the support 105-5, connected to the lower beam 105-13 of the upstanding clamping longitudinal conveyor device 101, and configured to move down the upstanding clamping longitudinal conveyor device 101.

By adjusting the height of the whole conveyor device with the pulley set, the present disclosure greatly simplifies a height adjustment mechanism and saves a cost. On the other hand, the pulley set cooperates with the wire rope 105-7 to drive the upstanding clamping longitudinal conveyor device 101 to move, such that the upstanding clamping longitudinal conveyor device 101 is stressed more uniformly, and moves more reliably.

Preferably, the position sensor is a rope-pull position sensor 105-8.

The speed reduction motor 105-1 is provided with an electromagnetic brake system. When the rope-pull position sensor 105-8 acquires that the height of the upstanding clamping longitudinal conveyor device 101 corresponds to the height of the gravity center of the reeds in the preharvest region, the control unit 7 cuts off the speed reduction motor 105-1, and the electromagnetic brake system works, such that the upstanding clamping longitudinal conveyor device 101 is stable at a preset height for height adjustment.

In an implementation of the present disclosure, a control method of the upstanding clamping longitudinal conveyor device 101 includes the following steps:

A coordinate of the laser radar 104 of the preharvest detection unit is set. The laser radar 104 scans the to-be-harvested reeds in front of the header 1, acquires the point cloud data for the reflection points of the reeds at the laser radar 104, and transmits the point cloud data to the control unit 7.

The control unit 7 performs coordinate transformation on the point cloud data, filters the point cloud data, uniformly segments the point cloud data in the preharvest region into a plurality of sub-regions, acquires a maximum $y_{ijmax}$ of a point cloud y coordinate in each of the plurality of sub-regions, calculates the average height $y_{avg}$ of the reeds in the preharvest region, calculates the height of the gravity center of the reeds by subtracting the height $h_1$ of the knife, and acquires the current height of the upstanding clamping longitudinal conveyor device 101 through the position sensor. The control unit 7 calculates the height difference between the height of the gravity center of the reeds and the current height of the upstanding clamping longitudinal conveyor device 101, and controls, according to the height difference, the lifting device to adjust the position of the upstanding clamping longitudinal conveyor device 101 to correspond to the gravity center of the reeds in the preharvest region.

Due to different varieties and habitats of the reeds, the heights of the reeds or the gravity centers of the reeds are different among one another. In order to clamp and convey the reeds reliably and tidily in upstanding clamping longitudinal conveyance of the reeds, the upstanding clamping conveyor chain of the upstanding clamping longitudinal conveyor device 101 in the present disclosure adjusts a clamping position in real time according to the height of the gravity center of the reeds, and the clamping conveyor chain is kept near the height of the gravity center of the reeds all the time.

Specifically, in an implementation of the present disclosure, the laser radar 104 is used to scan the reeds in front of the header of the reed harvester in real time to obtain three-dimensional (3D) point cloud data including growth heights and densities of the reeds. The 3D point cloud data is filtered and mathematically processed to obtain the point cloud data reflecting canopy heights of the reeds. The data is subjected to mean processing to obtain data for the canopy heights of the reeds in a fixed region in front of the header of the reed harvester. According to the data, the lifting device 105 adjusts the height of the upstanding clamping longitudinal conveyor device 101 of the header of the reed harvester in real time, such that the clamping height of the upstanding clamping longitudinal conveyor device 101 is kept near the height of the gravity center of the reeds all the time.

Figure 14:
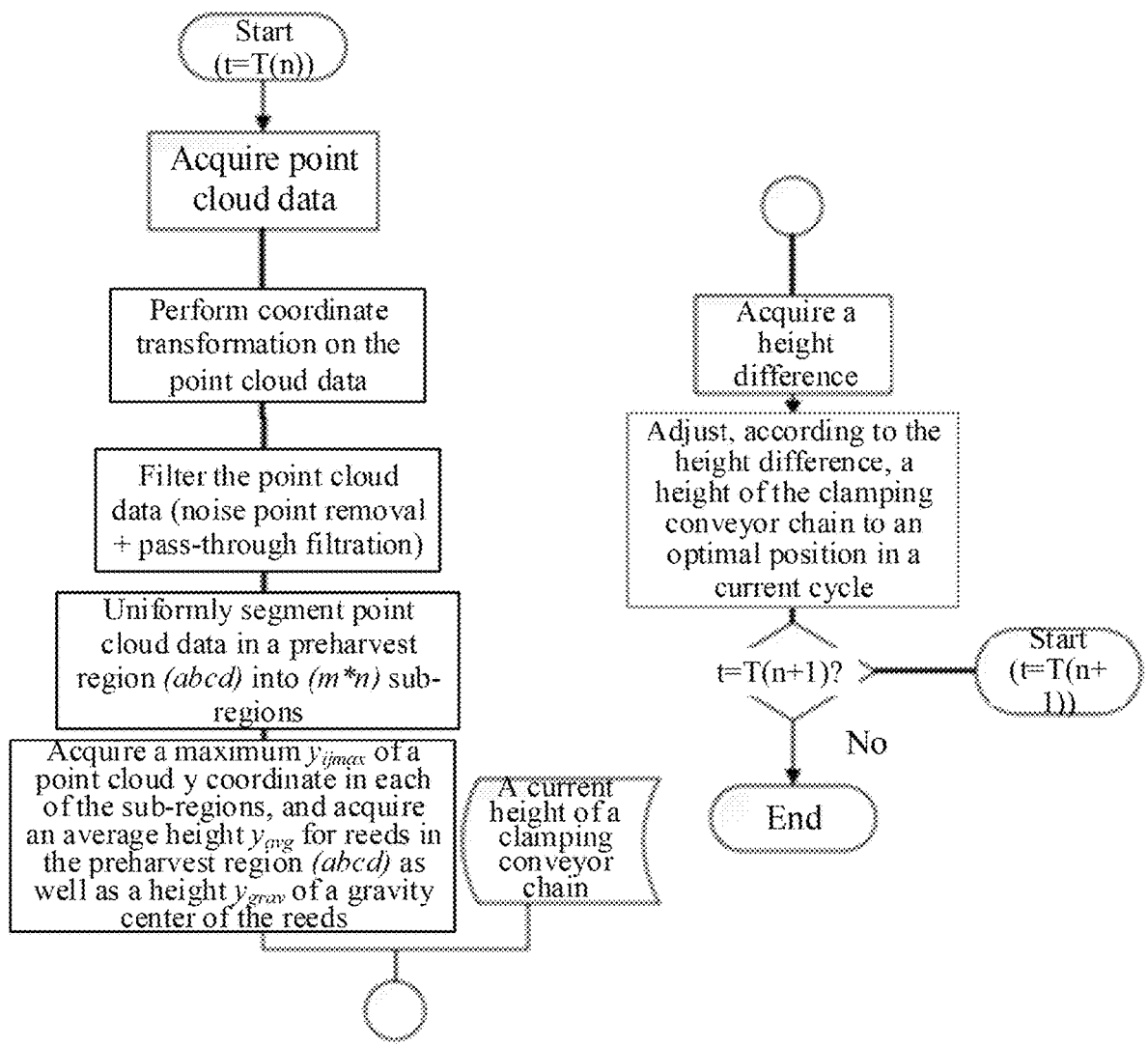
FIG. 14 is a flowchart of preharvest detection on an average height of reeds according to an implementation of the present disclosure.

In an implementation of the present disclosure, FIG. 14 shows a workflow chart of preharvest detection on the heights of the reeds. The laser radar 104 acquires point cloud data at current time t=T(n), and transmits the point cloud data to the control unit 7. The control unit 7 performs coordinate transformation on the point cloud data, filters the point cloud data (noise point removal+pass-through filter), uniformly segments point cloud data in a preharvest region into a plurality of sub-regions, acquires a maximum $y_{ijmax}$ of a point cloud y coordinate in each of the plurality of sub-regions, acquires an average height $y_{avg}$ of reeds in the preharvest region, and calculates a height $y_{grav}$ of a gravity center of the reeds.

The control unit acquires a current height of the upstanding clamping longitudinal conveyor device 101 through the position sensor. The control unit 7 calculates a height difference between the average height $y_{avg}$ of the reeds and the current height of the upstanding clamping longitudinal conveyor device 101, and adjusts, according to the height difference, a position of the upstanding clamping longitudinal conveyor device 101 in a current cycle to correspond to the gravity center of the reeds in the preharvest region. In case of t=T(n+1), a next cycle is started to adjust (t=T)n+1)), n representing the current cycle, and n+1 representing the next cycle.

Preferably, the height of the gravity center of the reeds is $$\frac{2h_2}{3},$$

$h_2=h_{avg}-h_1$, namely $$y_{grav} = \frac{2(h_{avg} - h_1)}{3},$$

$h_1$ being the height detected by the knife height sensor 103-1 for the knife above the ground.

Figure 15:
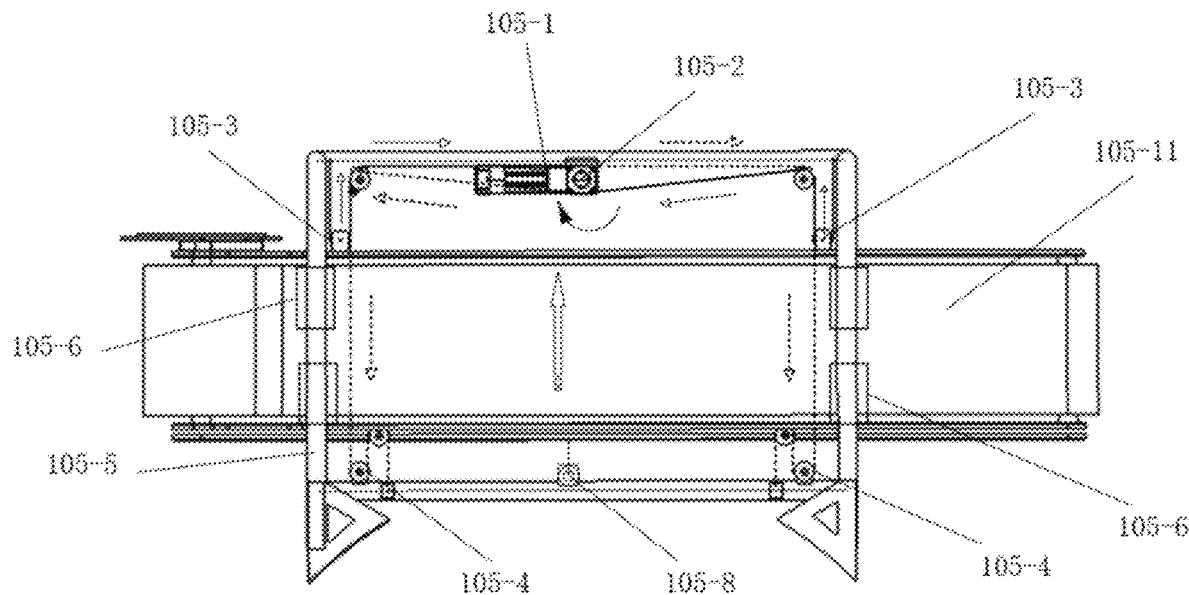
FIG. 15 is a schematic view illustrating that a clamping conveyor chain moves up according to an implementation of the present disclosure.
Figure 16:
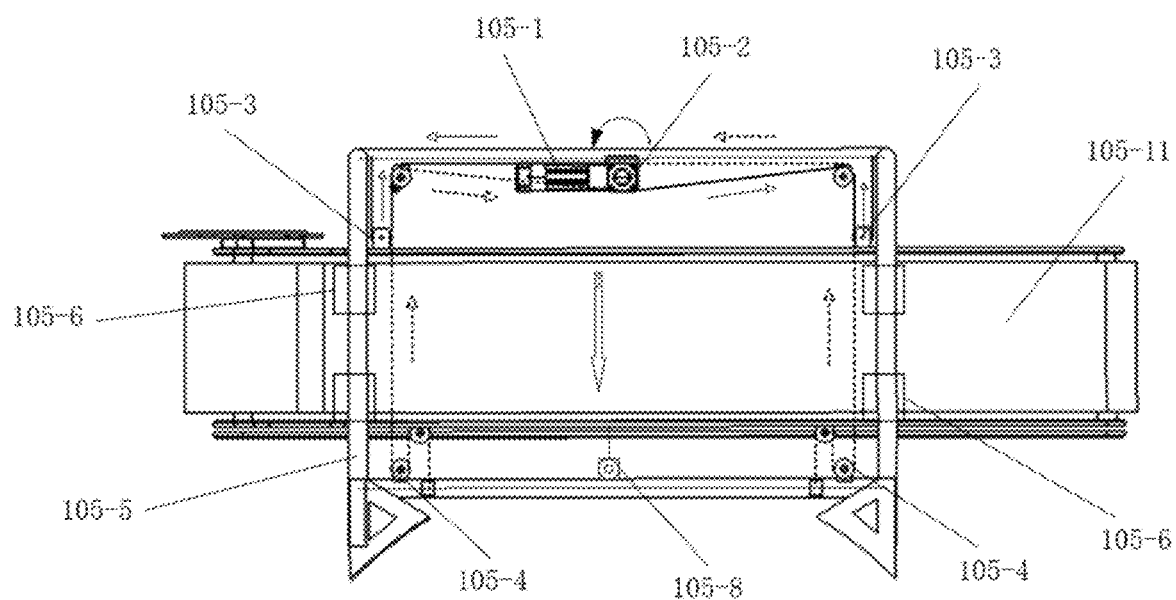
FIG. 16 is a schematic view illustrating that a clamping conveyor chain moves down according to an implementation of the present disclosure.

The lifting device adjusts the position of the two symmetric upstanding longitudinal conveyor mechanisms to correspond to the gravity center of the reeds in the preharvest region, specifically:

The speed reduction motor 105-1 of the lifting device drives the coupled twin winch 105-2 to rotate clockwise. The coupled twin winch 105-2 includes a driving pulley A and a driving pulley B. The driving pulley A and the driving pulley B are fixedly connected and rotate at the same time. The driving pulley A in the coupled twin winch 105-2 drives the first pulley set 105-3. As shown by a solid line in FIG. 15, the first pulley set 105-3 driven by the driving pulley A in the coupled twin winch drives the upstanding clamping longitudinal conveyor device 101 to move up. The driving pulley B in the coupled twin winch 105-2 is connected to the second pulley set 105-4. As shown by a dotted line in FIG. 15, the driving pulley B is in a rope releasing state, to ensure that the upstanding clamping longitudinal conveyor device 101 moves up. The speed reduction motor 105-1 drives the coupled twin winch 105-2 to rotate counterclockwise. The driving pulley B in the coupled twin winch 105-2 drives the second pulley set 105-4. As shown by a dotted line in FIG. 16, the second pulley set 105-4 driven by the driving pulley B in the coupled twin winch drives the upstanding clamping longitudinal conveyor device 101 to move down. The driving pulley A in the coupled twin winch 105-2 is connected to the first pulley set 105-3. As shown by a solid line in FIG. 16, the driving pulley A is in a rope releasing state, to ensure that the upstanding clamping longitudinal conveyor device 101 moves down.

The transverse conveyor device 102 is provided in front of the upstanding clamping longitudinal conveyor device 101. The knife 103 is provided under the transverse conveyor device 102. The upstanding clamping longitudinal conveyor device 101 is connected to the clamping conveyor chain height adjustment mechanism. The knotter 2 is located behind the upstanding clamping longitudinal conveyor device 101. The stacking mechanism 4 is located behind the knotter 2. The knotter 2 is configured to knot the reeds conveyed from the upstanding clamping longitudinal conveyor device 101 into the small bales. The stacking mechanism 4 is configured to stack the small bales of reeds to the feed box 3.

As shown in FIG. 10, the efficient reed harvester further includes a root debris cleaning device 106. The root debris cleaning device is provided under the upstanding clamping longitudinal conveyor device 101. The root debris cleaning device includes a brush 106-1, a rotating shaft 106-2, and a motor 106-3. The rotating shaft 106-2 is connected to an output shaft of the motor 106-3. The brush 106-1 is provided on the rotating shaft 106-2.

Figure 17:
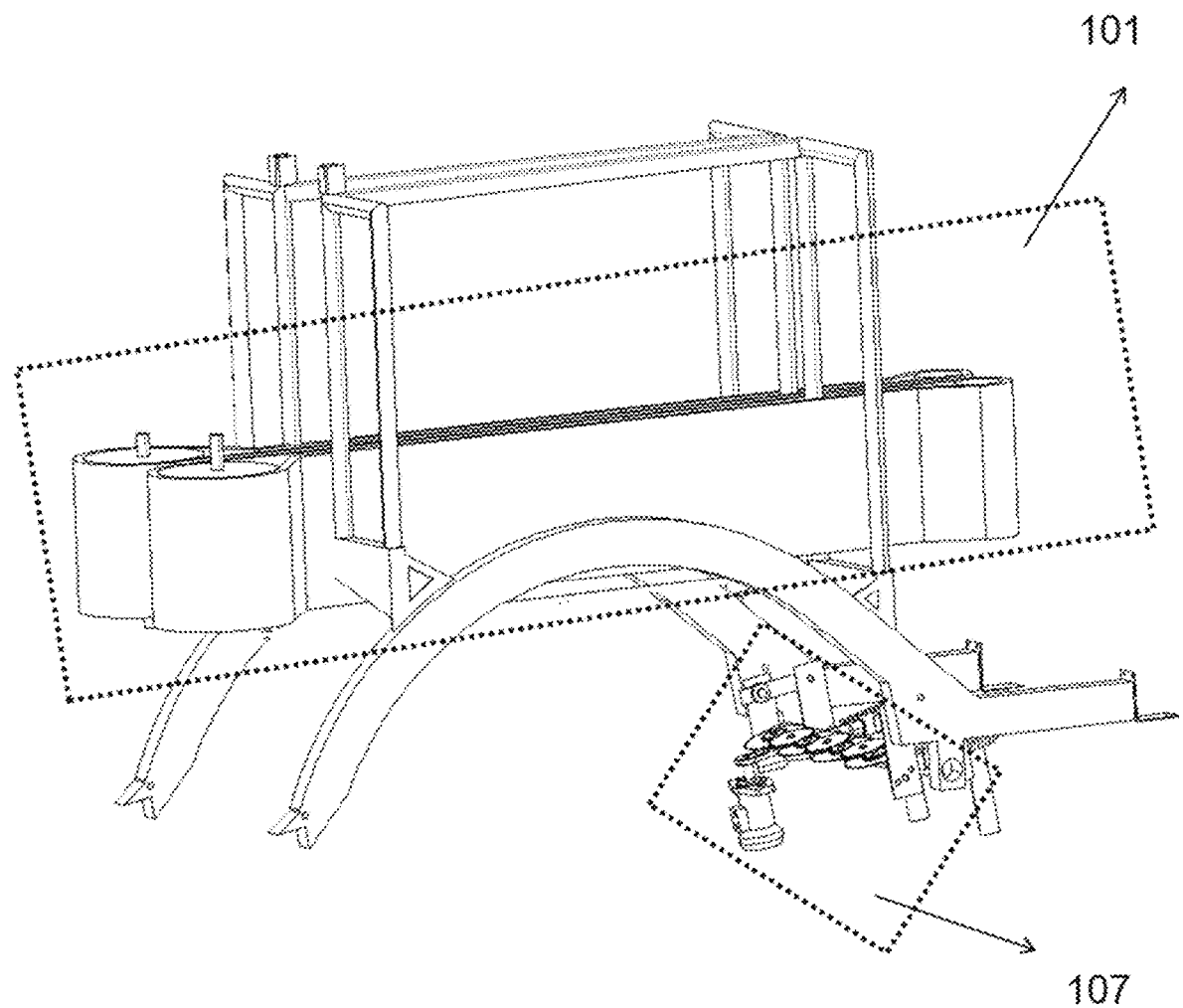
FIG. 17 is a schematic view of a mounting position of a root disc knife apparatus according to an implementation of the present disclosure.
Figure 18:
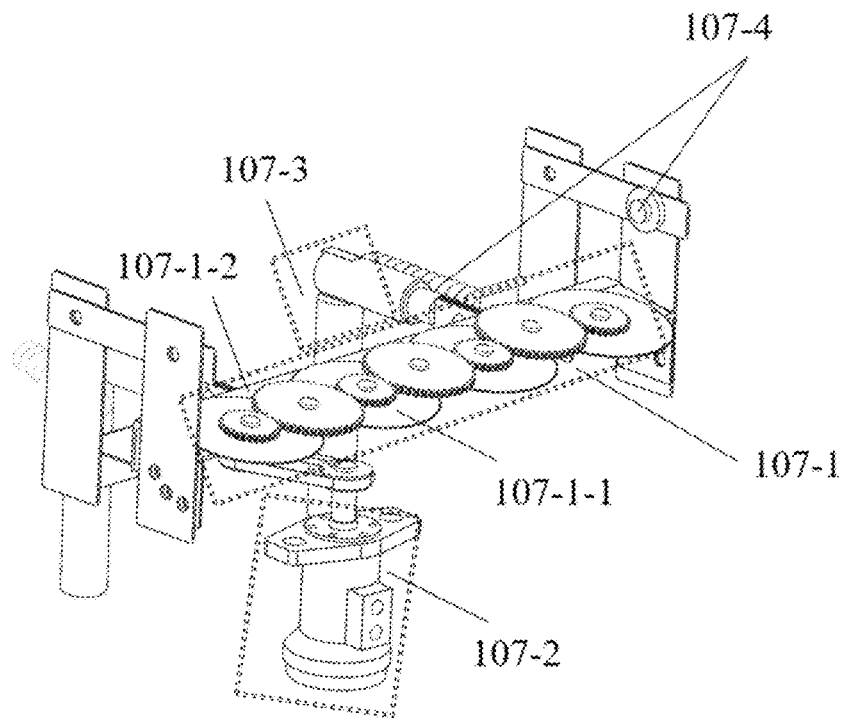
FIG. 18 is a schematic structural view of a disc knife device according to an implementation of the present disclosure.

As shown in FIG. 17 and FIG. 18, the efficient reed harvester further includes a root disc knife apparatus 107. The root disc knife apparatus 107 is provided at a bottom rear end of the conveyor device of the reed combine harvester, and includes a disc knife device 107-1, a drive device 107-2, a height adjusting device 107-3, and a vibration damping device 107-4.

The height adjusting device 107-3 is provided on a harvester frame.

The disc knife device 107-1 is provided on the height adjusting device 107-3.

The vibration damping device 107-4 is provided on the disc knife device 107-1.

The drive device 107-2 is connected to the disc knife device 107-1, and can provide power for the disc knife device 107-1.

The disc knife device 107-1 includes a plurality of disc knives 107-1-1 and a knife rest 107-1-2. The plurality of disc knives 107-1-1 are provided on the knife rest 107-1-2 equidistantly.

According to the embodiment, preferably, the disc knives 107-1-1 each are a zigzag disc knife, with a small acting force and a small resistance to the stem in cutting. This can prolong a service life.

According to the embodiment, preferably, four or six disc knives 107-1-1 are obliquely provided on the knife rest 107-1-2 at a certain angle. A distance between the disc knives 107-1-1 is the same.

Figure 19:
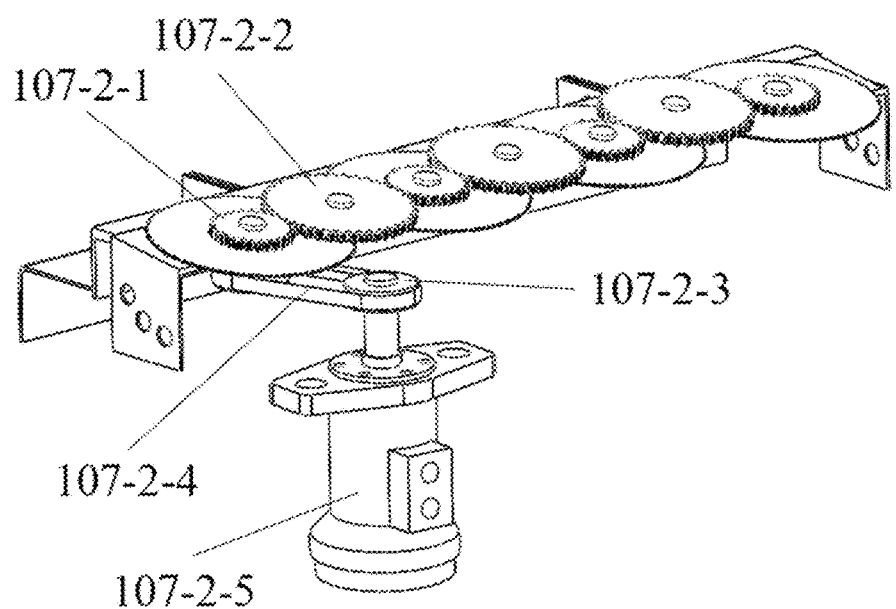
FIG. 19 is a schematic structural view of a drive device according to an implementation of the present disclosure.

As shown in FIG. 19, the drive device 107-2 includes a plurality of pinions 107-2-1, a plurality of gears 107-2-2, two transmission pulleys 107-2-3, a transmission belt 107-2-4, and a hydraulic motor 107-2-5.

The plurality of pinions 107-2-1 are arranged on the knife rest 107-1-2, and respectively connected to the disc knives 107-1-1 through a transmission shaft.

The gears 107-2-2 each are provided between and engaged with two adjacent ones of the pinions 107-2-1.

One of the two transmission pulleys 107-2-3 is provided on the transmission shaft between the pinion 107-2-1 and the disc knife 107-1-1, and the other of the two transmission pulleys is provided at an output end of the hydraulic motor 107-2-5.

The transmission belt 107-2-4 is provided on the two transmission pulleys 107-2-3.

When the drive device 107-2 works, the transmission belt 107-2-4 transmits power of the hydraulic motor 107-2-5 to the leftmost disc knife 107-1-1 and the leftmost pinion 107-2-1. The pinion 107-2-1 in rotation drives the gear to rotate. The gear 107-2-2 in rotation drives the left second pinion 107-2-1 to rotate. The second pinion 107-2-1 in rotation drives the disc knife 107-1-1 thereunder to rotate, and so on. Through engaged transmission between the pinion and the gear, the power of the hydraulic motor 107-2-5 is transmitted to each disc knife 107-1-1. Therefore, the disc knife 107-1-1 rotates to cut the roots of the reeds.

According to the embodiment, preferably, the hydraulic motor 107-2-5 is provided at one end of the knife rest 107-1-2.

According to the embodiment, preferably, one transmission pulley 107-2-3 is provided on the transmission shaft between the leftmost pinion 107-2-1 and the leftmost disc knife 107-1-1, and the other transmission pulley is provided at the output end of the hydraulic motor 107-2-5.

Figure 20:
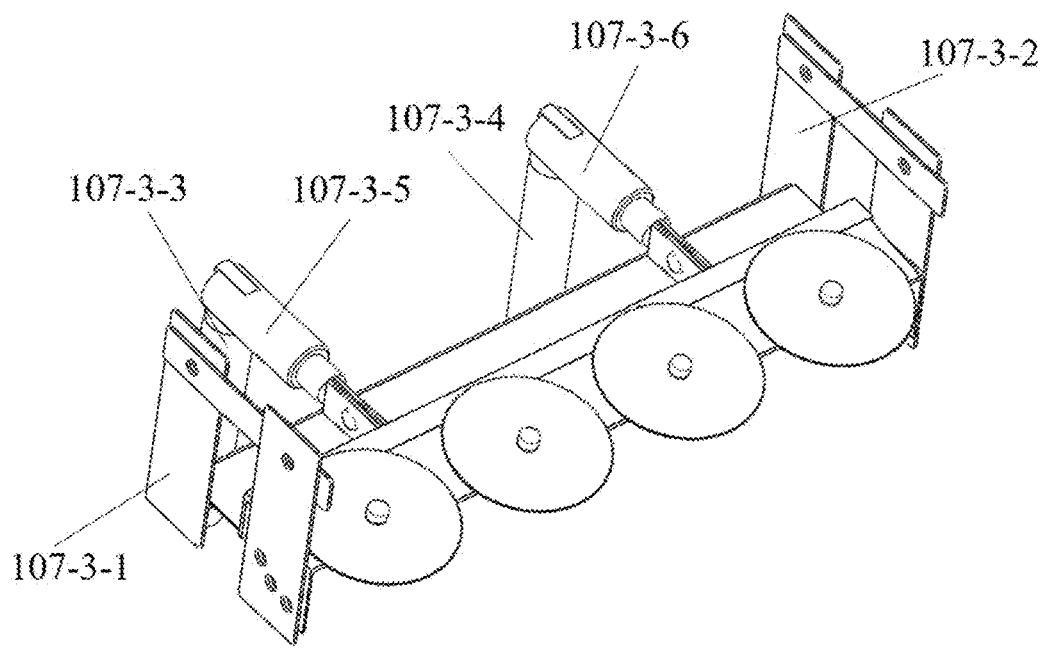
FIG. 20 is a schematic structural view of a height adjusting device according to an implementation of the present disclosure.

As shown in FIG. 20, according to the embodiment, preferably, the height adjusting device 107-3 includes a first side plate 107-3-1, a second side plate 107-3-2, a first height adjustment hydraulic cylinder 107-3-3, a second height adjustment hydraulic cylinder 107-3-4, a first height adjusting rod 107-3-5, and a second height adjusting rod 107-3-6.

The first side plate 107-3-1 and the second side plate 107-3-2 are respectively provided at two sides of the knife rest 107-1-2. This can prevent the roots of the reeds from exposing out of the side of the knife rest.

The first height adjusting rod 107-3-3 includes one end connected to the knife rest 107-1-2, and the other end connected to the first height adjustment hydraulic cylinder 107-3-3.

The second height adjusting rod 107-3-6 includes one end connected to the knife rest 107-1-2, and the other end connected to the second height adjustment hydraulic cylinder 107-3-4.

In work, by controlling an amount of expansion and contraction of the first height adjustment hydraulic cylinder 107-3-3 and an amount of expansion and contraction of the second height adjustment hydraulic cylinder 107-3-4, the height adjusting device 107-3 can drive the knife rest 107-1-2 through the first height adjusting rod 107-3-5 and the second height adjusting rod 107-3-6 to slide up and down, thereby driving the disc knife on the knife rest to slide up and down. Since the hydraulic motor 107-2-5 is provided at one end of the knife rest 107-1-2, the hydraulic motor 107-2-5 can also slide up and down with the knife rest 107-1-2, thereby ensuring that power transmission of the disc knife 107-1-1 is not interrupted.

Figure 21:
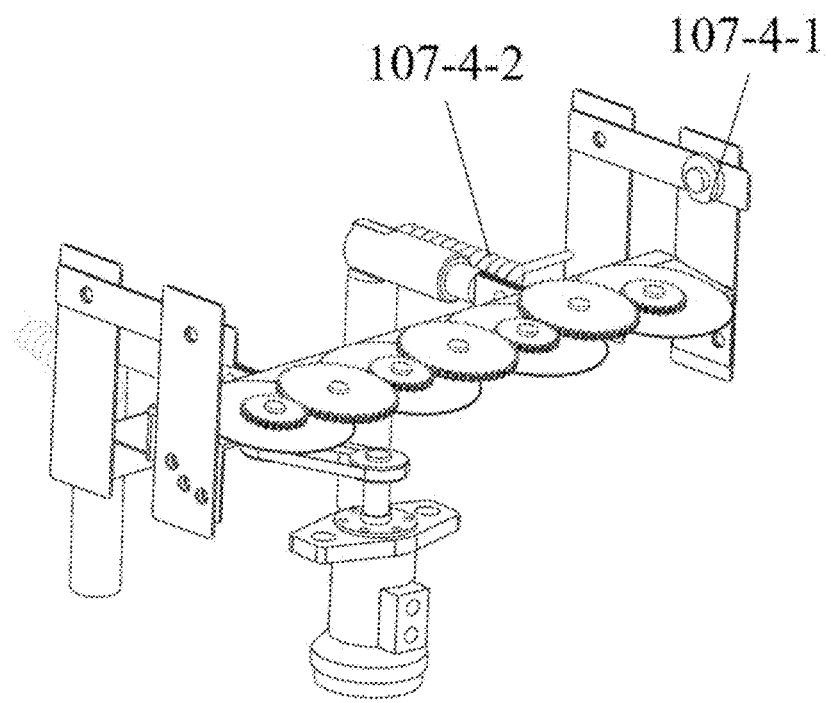
FIG. 21 is a schematic structural view of a vibration damping device according to an implementation of the present disclosure.

As shown in FIG. 21, according to the embodiment, preferably, the vibration damping device 107-4 includes two vibration absorbers 107-4-1.

The vibration absorbers 107-4-1 are respectively provided on the first side plate 107-3-1 and the second side plate 107-3-2. This can reduce vibration in cutting.

According to the embodiment, preferably, the vibration damping device 107-4 further includes two damping springs 107-4-2.

One damping spring 107-4-2 includes one end connected to the first side plate 107-3-1, and the other end connected to the first height adjustment hydraulic cylinder 107-3-3. This can reduce vibration in lifting of the first height adjustment hydraulic cylinder 107-3-3.

The other damping spring 107-4-2 includes one end connected to the second side plate 107-3-2, and the other end connected to the second height adjustment hydraulic cylinder 107-3-4. This can reduce vibration in lifting of the second height adjustment hydraulic cylinder 107-3-4.

Figure 22:
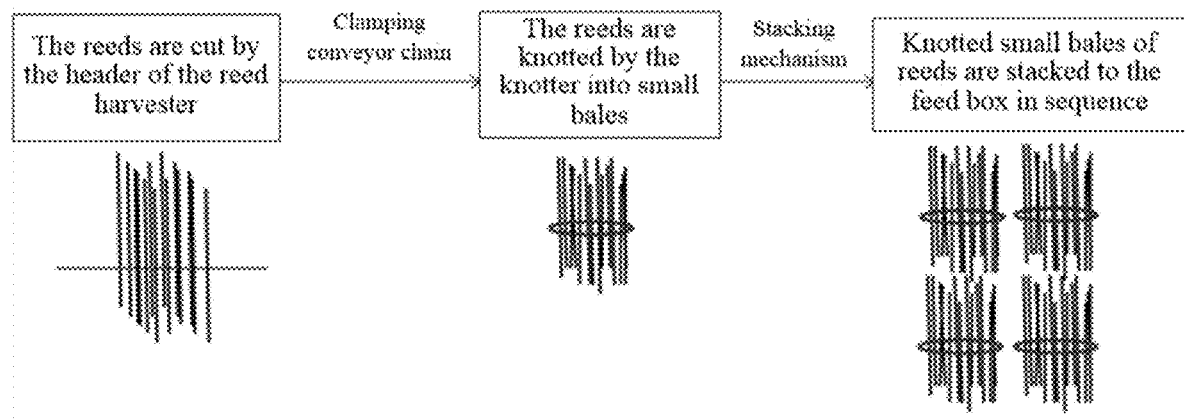
FIG. 22 is a schematic working diagram illustrating that baled reeds are automatically conveyed and stacked to a feed box device according to an implementation of the present disclosure.

As shown in FIG. 1, the baling-stacking device includes a knotter 2, a feed box 3, and a stacking mechanism 4. The knotter 2 is located behind the header 1 and the conveyor mechanism. The stacking mechanism 4 is located between the knotter 2 and the feed box 3. The knotter 2 is configured to knot the reeds into the small bales. The stacking mechanism 4 is configured to stack the small bales of reeds to the feed box 3 vertically or horizontally. The feed box 3 is configured to knot the small bales of reeds into the big bale, as shown in FIG. 22.

The control unit 7 is connected to the feed box 3 and the stacking mechanism 4. The control unit 7 is configured to control the stacking mechanism 4 to stack the small bales of reeds to the feed box 3 vertically or horizontally, and control the feed box 3 to knot the small bales of reeds into the big bale.

According to the embodiment, preferably, the stacking mechanism 4 includes a first mechanical clamp 401, a second mechanical clamp 402, and a drive component connected to the control unit 7.

Figure 23:
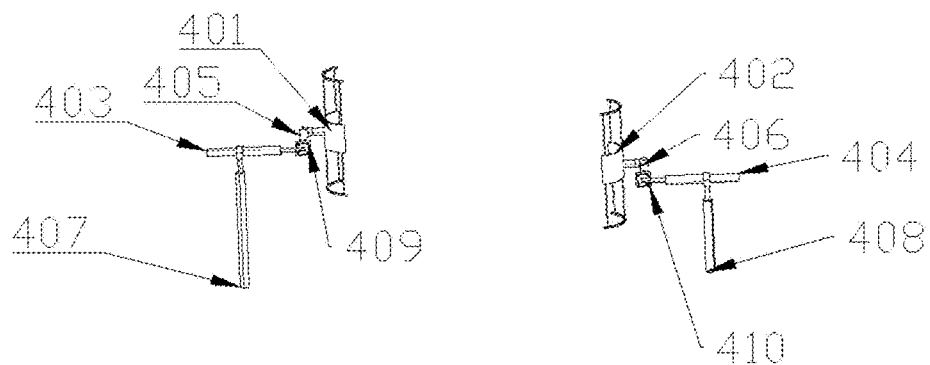
FIG. 23 is a schematic structural view of a mechanical clamp according to an implementation of the present disclosure.

As shown in FIG. 23, the first mechanical clamp 401 and the second mechanical clamp 402 are opposite to each other. The first mechanical clamp 401 and the second mechanical clamp 402 are connected to the drive component. The drive component is configured to drive the first mechanical clamp 401 and the second mechanical clamp 402 to move along an X-axis direction, a Y-axis direction, and a Z-axis direction. The first mechanical clamp 401 and the second mechanical clamp 402 are configured to clamp and stack the small bales of reeds to the feed box 3.

Further, the drive component includes a first drive mechanism 403, a second drive mechanism 404, a third drive mechanism 405, a fourth drive mechanism 406, a fifth drive mechanism 407, a sixth drive mechanism 408, a first execution mechanism 409, and a second execution mechanism 410 that are connected to the control unit 7.

The first mechanical clamp 401 is connected to one end of the third drive mechanism 405. The other end of the third drive mechanism 405 is connected to one end of the first drive mechanism 403 through the first execution mechanism 409. The other end of the first drive mechanism 403 is connected to one end of the fifth drive mechanism 407. The other end of the fifth drive mechanism 407 is provided at a position of the harvester chassis 6 close to the knotter 2. The first drive mechanism 403 is configured to adjust movement of the first mechanical clamp 401 along the X-axis direction. The third drive mechanism 405 is configured to adjust movement of the first mechanical clamp 401 along the Y-axis direction. The fifth drive mechanism 407 is configured to adjust movement of the first mechanical clamp 401 along the Z-axis direction. The first execution mechanism 409 is configured to drive the third drive mechanism 405 to rotate the first mechanism clamp 401, such that the first mechanism clamp 401 is vertical or horizontal.

The second mechanical clamp 402 is connected to one end of the fourth drive mechanism 406. The other end of the fourth drive mechanism 406 is connected to one end of the second drive mechanism 404 through the second execution mechanism 410. The other end of the second drive mechanism 404 is connected to one end of the sixth drive mechanism 408. The other end of the sixth drive mechanism 408 is provided at a position of the harvester chassis 6 close to the knotter 2. The second drive mechanism 404 is configured to adjust movement of the second mechanical clamp 402 along the X-axis direction. The fourth drive mechanism 406 is configured to adjust movement of the second mechanical clamp 402 along the Y-axis direction. The sixth drive mechanism 408 is configured to adjust movement of the second mechanical clamp 402 along the Z-axis direction. The second execution mechanism 410 is configured to drive the fourth drive mechanism 406 to rotate the second mechanism clamp 402, such that the second mechanism clamp 402 is vertical or horizontal.

According to the embodiment, preferably, the first drive mechanism 403, the second drive mechanism 404, the third drive mechanism 405, the fourth drive mechanism 406, the fifth drive mechanism 407, and the sixth drive mechanism 408 each are a hydraulic cylinder.

In an implementation of the present disclosure, a linear displacement sensor is provided on the hydraulic cylinder, and configured to detect an amount of expansion and contraction of the hydraulic cylinder, and feed the amount of expansion and contraction of the hydraulic cylinder back to the control unit 7. The control unit 7 adjusts the amount of expansion and contraction of the hydraulic cylinder according to a preset value.

According to the embodiment, preferably, the first execution mechanism 409 and the second execution mechanism 410 each are a hydraulic motor.

In an implementation of the present disclosure, the stacking mechanism 4 has the following stacking process:

Through expansion and contraction of the first drive mechanism 403 and the second drive mechanism 404, the mechanism clamps are respectively adjusted to initial positions, namely reed baling positions. Thereafter, the left mechanical clamp and the right mechanical clamp are adjusted to clamp the bales of reeds and convey the bales of reeds to the feed box for stacking.

In an implementation of the present disclosure, the baling positions are located at an edge of the feed box 3. According to the baling positions, the initial positions of the mechanical clamps can be adjusted again. Hence, at the initial positions, a displacement of the first drive mechanism 403 and a displacement of the second drive mechanism 404 are two x coordinates in a first row for stacking. Then, the third drive mechanism 405 and the fourth drive mechanism 406 come into use. By expanding the hydraulic cylinders, the mechanical clamps are driven to move in the y-axis direction to stack the reeds in sequence. Displacements of all hydraulic cylinders are measured and located by the linear displacement sensor.

Figure 24:
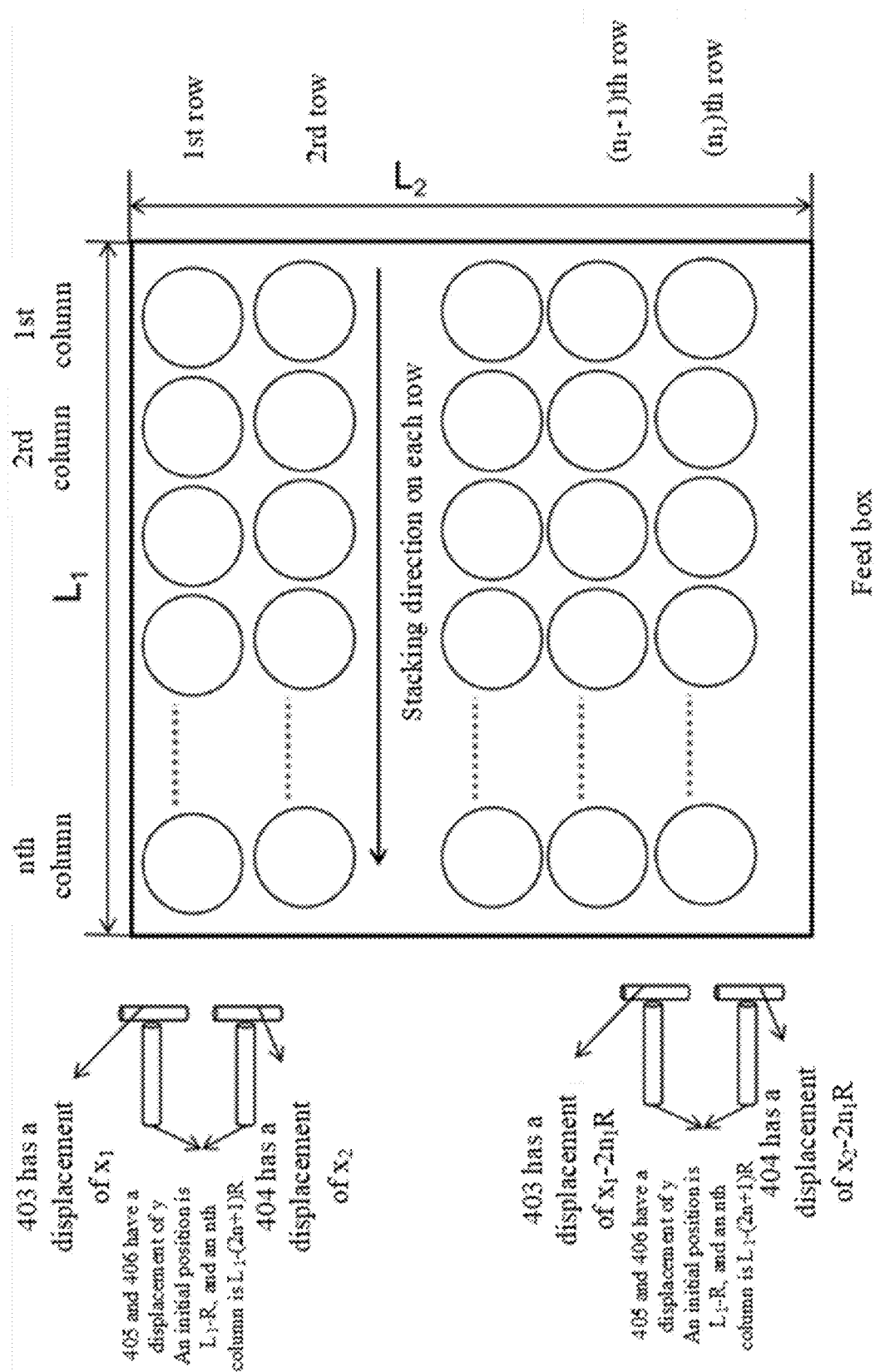
FIG. 24 is a schematic arrangement diagram when reeds are vertically conveyed and stacked according to an implementation of the present disclosure.

As shown in FIG. 24, in an implementation of the present disclosure, the stacking mechanism 4 is configured to stack the small bales of reeds to the feed box 3 vertically or horizontally in sequence. This makes reasonable use of a space of the feed box 3 to stack the bales of reeds, facilitates efficient recycling of the reeds, and also facilitates subsequent knotting of the small bales into the big bale in the feed box 3.

In an implementation of the present disclosure, the stacking mechanism 4 realizes vertical stacking on the bales of reeds in a following manner. Here is a specific embodiment only, and is intended to explain the present disclosure rather than limiting the present disclosure. Other manners are also available. As is known, the bales of reeds to be baled each have a radius of R, the R is determined by the knotter, and the feed box has a length of $L_1$ along the y-axis direction. In this case, a number of bales of reeds stackable to the feed box can be calculated as n, $n=(L_1/2R)$, n being an integer with a decimal rejected. At the initial positions of the mechanical clamps, the initial displacement of the first drive mechanism 403 and the initial displacement of the second drive mechanism 404 are respectively $x_1$ and $x_2$, and the third drive mechanism 405 and the fourth drive mechanism 406 for stacking a first bale of reeds each have a displacement of $L_1$-R. A real-time position relationship between the mechanical clamps for stacking the bale of reeds can be characterized by three parameters. The three parameters are respectively the displacement $x_{left}$ of the first drive mechanism, the displacement $x_{right}$ of the second drive mechanism, and the displacement of the third drive mechanism or the displacement y of the fourth drive mechanism. The third drive mechanism 405 and the fourth drive mechanism 406 each have the initial position located at the edge of the feed box 3, and have a displacement of zero. Three parameters corresponding to the first bale of reeds stacked in the first row are $x_1$, $x_2$, and $L_1$-R respectively, three parameters corresponding to a second bale of reeds stacked in the first row are $x_1$, $x_2$, and $L_1$-3R respectively, until an nth bale of reeds is stacked in the first row and corresponding three parameters are $x_1$, $x_2$, and $L_1$-(2n+1)R respectively.

The parameters of the first bale of reeds in the first row are $x_1$, $x_2$, and $L_1$-R respectively.

The parameters of the first bale of reeds in the first row are $x_1$, $x_2$, and $L_1$-3R respectively.

The parameters of the nth bale of reeds in the first row are $x_1$, $x_2$, and $L_1$-(2n+1)R respectively.

Once the mechanical clamps reach positions for stacking the bale of reeds, the second drive mechanism 404 is loosened, such that the second mechanical clamp 402 releases the bale of reeds and returns to the initial position to clamp another bale of reeds again. In order to prevent contact between the second mechanical clamp 402 and a right cover of the feed box when the bales of reeds are stacked on a last row, an enough space is required. Generally, if a minimum spatial distance when the device does not come into contact is h, a number of stackable rows is $n_1=(L_2-h)/2R$, $n_1$ being an integer with a decimal rejected.

The parameters of the first bale of reeds in the second row are $x_1+2R$, $x_2-2R$, and $L_1$-R respectively.

The parameters of the first bale of reeds in the second row are $x_1+2R$, $x_2-2R$, and $L_1$-3R respectively.

The parameters of the nth bale of reeds in the second row are $x_1+2R$, $x_2-2R$, and $L_1$-(2n+1)R respectively.

The bales of reeds are placed to an $(n_1)$th row in sequence. In this case, the parameters are as follows:

The parameters of the first bale of reeds in the $(n_1)$th row are $x_1+2n_1R$, $x_2-2n_1R$, and $L_1$-R respectively.

The parameters of the first bale of reeds in the $(n_1)$th row are $x_1+2n_1R$, $x_2-2n_1R$, and $L_1$-3R respectively.

The parameters of the nth bale of reeds in the $(n_1)$th row are $x_1+2n_1R$, $x_2-2n_1R$, $L_1$-(2n+1)R respectively.

Figure 25:
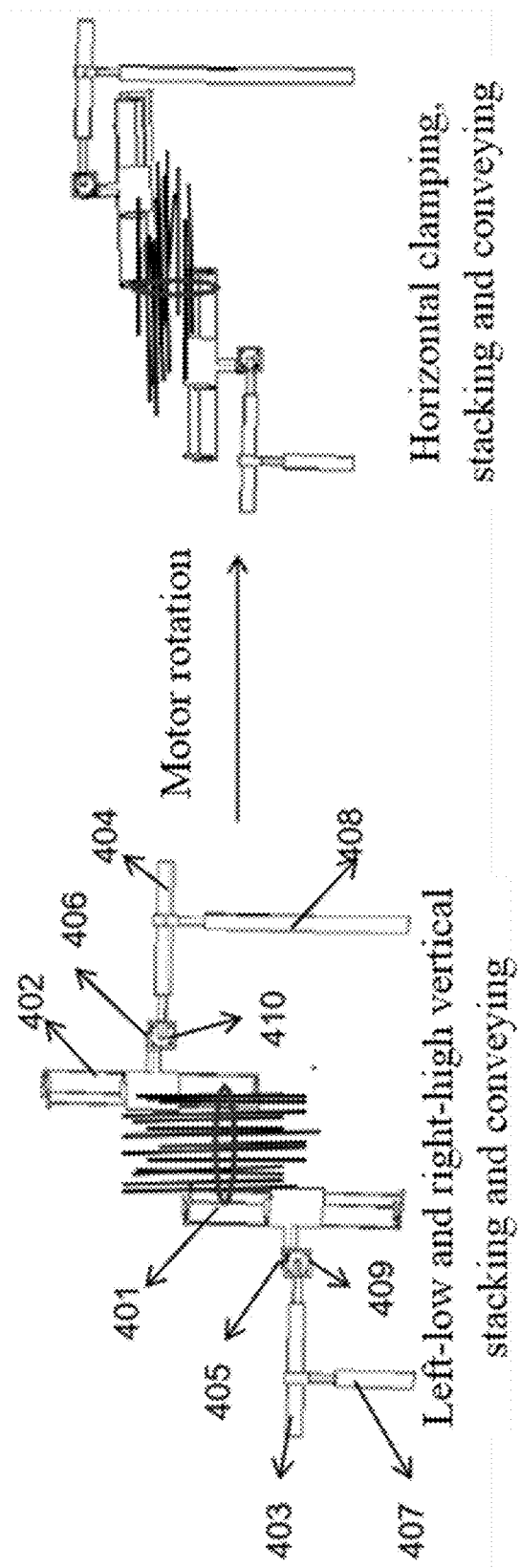
FIG. 25 is a schematic diagram of a mechanical clamp changing from a vertical state to a horizontal state according to an implementation of the present disclosure.

As shown in FIG. 25, in an implementation of the present disclosure, the mechanical clamps each are shaped as a circular arc, which facilitates contact with the bale of reeds and facilitates clamping. The mechanical clamps at two sides are provided high and low. This not only can ensure that the bale of reeds is clamped, stacked and conveyed vertically, but also can ensure that the mechanical clamp does not affect horizontal clamping on the bale of reeds after rotating for 90 degrees. With one mechanical clamp above and one mechanical clamp below, the horizontal stacking is realized.

In an implementation of the present disclosure, when the bale of reeds is to be stacked horizontally, the bale of reeds is clamped vertically by the mechanical clamps. The hydraulic motor rotates shafts connected to the mechanical clamps, and drives the shafts to rotate for 90 degrees. The two vertical mechanical clamps are rotated to a horizontal position. Under an action of the left second drive mechanism 404, the bale of reeds is conveyed to the first row of the feed box. This ensures that the lower mechanical clamp has an enough space to move, and ensures that the bale of reeds falls off. Hence, a considerable space should be kept from a left side of the feed box 3, so as to ensure that the current lower mechanical clamp can move for withdrawal. The spatial distance is set as m. The m is associated with a length of the bale of reeds and a width of the feed box.

Figure 26:
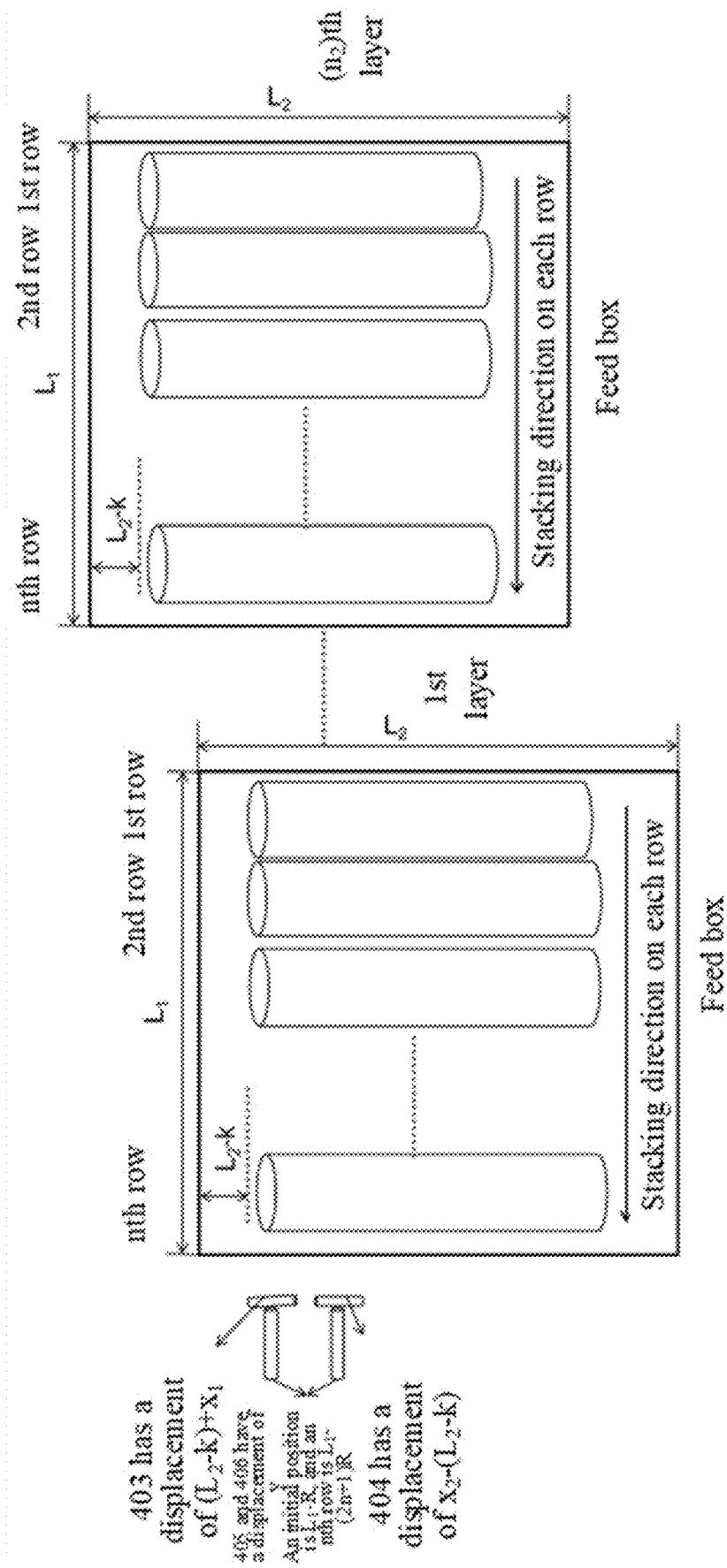
FIG. 26 is a schematic arrangement diagram when reeds are horizontally conveyed and stacked according to an implementation of the present disclosure.

As shown in FIG. 26, the feed box has a width of $L_2$ along the x-axis direction, and the bale of reeds has a height of k. When the bale of reeds is stacked horizontally by the mechanical clamps, the lower mechanical clamp is basically near a root of the bale of reeds. Hence, a space reserved for the mechanical clamp for extension is $L_2$-k, $L_2$-k being greater than a height of the mechanical clamp. When the lower mechanical clamp moves toward the remaining space, the upper mechanical clamp extends downward under an up-down position adjusting hydraulic cylinder, and can apply a downward force to the bale of reeds. With simultaneous movement in two directions, it can be ensured that the bale of reeds is released from the mechanical clamps and conveyed horizontally. Then, the mechanical clamps return to the initial positions to clamp and convey a second bale of reeds for sequential stacking. For the second bale of reeds in the first row, the y parameter is y-3R, the left parameter $x_{left}$ is $(L_2-k)+x_1$, and the right parameter $x_{right}$ moves rightward by $L_2$-k on the basis of the displacement $x_2$ of the cylinder in the original vertical clamping, that is, the $x_{right}$ is $x_2-(L_2-k)$.

n rows can be stacked on each layer, $n=L_1/2R$. Upon a first layer is stacked completely, a second layer is stacked from a position for a first bale of reeds. Three parameters for the bale of reeds in each row of the second layer are the same as those for the bale of reeds in each row of the first layer, till a last row on a $(n_2)$th layer is stacked. The big bale formed by the small bales is unloaded by a driver. $n_2=L_3/2R$ ($n_2$ being an integer with a decimal rejected), $L_3$ being the height of the feed box. When the bales of reeds are to be stacked horizontally, three parameters ($x_{left}$, $x_{right}$, and y) change as follows:

First row on the first layer: $(L_2-k)+x_1$, $x_2-(L_2-k)$, and y-R

Second row on the first layer: $(L_2-k)+x_1$, $x_2-(L_2-k)$, and y-3R nth row on the first layer: $(L_2-k)+x_1$, $x_2-(L_2-k)$, and y-(2n+1)R After the first layer is stacked completely, the second layer is stacked. For the second layer, the parameters for the bales of reeds in each row is the same as those for the bales of reeds in the first row, provided that the displacement of the hydraulic cylinder at the height of the mechanical clamp is adjusted. Until the bales of reeds are stacked in an nth row on the $(n_2)$th layer completely, the current stacking is ended and unloading is performed. Here is only a specific embodiment, and is intended to explain the present disclosure, instead of being construed as limiting the present disclosure.

Figure 27:
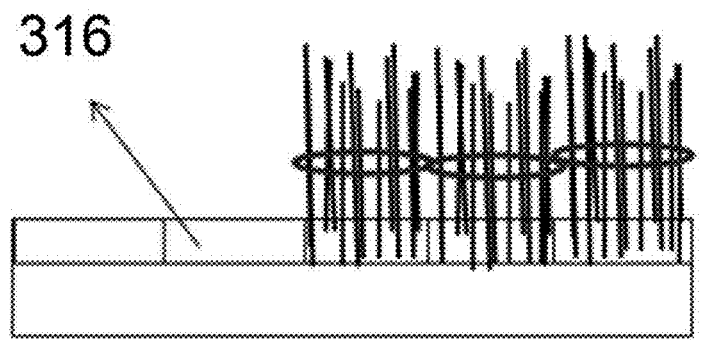
FIG. 27 is a view of a groove of a feed box according to an implementation of the present disclosure.
Figure 28:
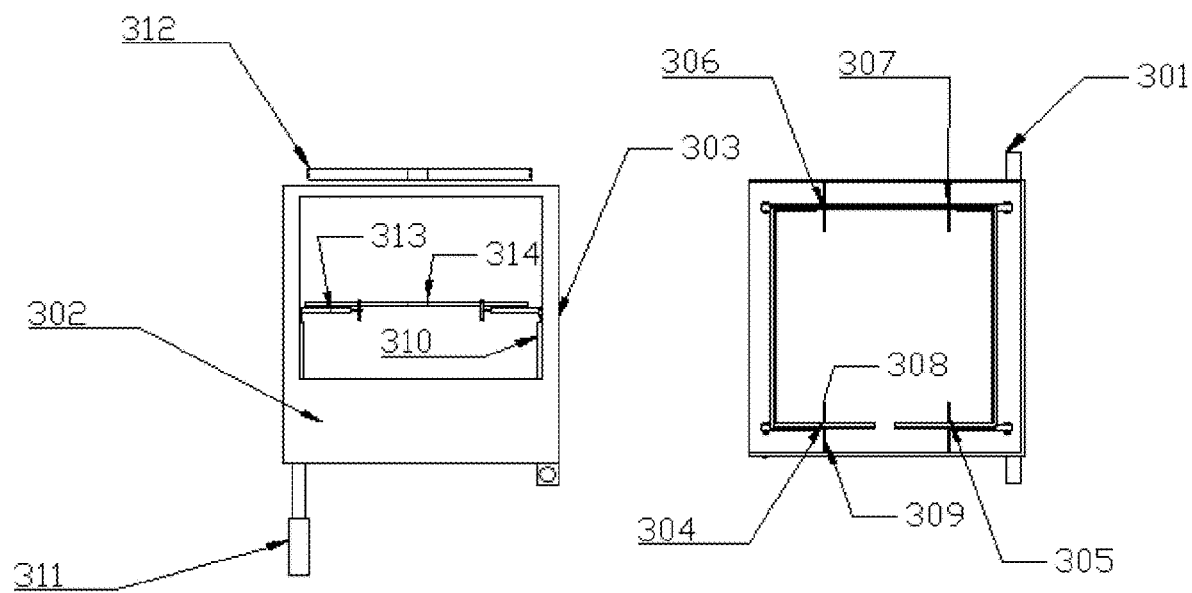
FIG. 28 is a schematic structural view of a feed box according to an implementation of the present disclosure.

According to the embodiment, preferably, in order to ensure that the small bales of reeds entering the feed box 3 in the vertical stacking does not topple and fall, a small groove 316 with a certain height may be formed in a bottom of the feed box 3, such that the stacked small bales of reeds are stacked in the feed box 3 vertically and stably, as shown in FIG. 27.

As shown in FIGS. 28-35C, according to the embodiment, preferably, the feed box 3 includes a feed box housing 302.

A baling mechanism is provided in the feed box housing 302. The baling mechanism includes a wire clamp and a drive mechanism. The wire clamp is configured to clamp a steel wire 314. The drive mechanism is configured to drive the wire clamp to knot the small bales of reeds into the big bale.

In an implementation of the present disclosure, the wire clamp includes a first wire clamp 304, a second wire clamp 305, a third wire clamp 306, and a fourth wire clamp 307. The first wire clamp 304, the second wire clamp 305, the third wire clamp 306, and the fourth wire clamp 307 are connected to the feed box housing 302 through a drive mechanism. The first wire clamp 304 and the second wire clamp 305 are provided oppositely at one side in the feed box housing 302, and the third wire clamp 306 and the fourth wire clamp 307 are provided oppositely at the other side in the feed box housing 302. The drive mechanism includes a ninth drive mechanism 310, an eleventh drive mechanism 313, and a twelfth drive mechanism 315. The ninth drive mechanism 310 includes one end connected to the twelfth drive mechanism 315 provided on a bottom plate of the feed box housing 302, and the other end connected to one end of the eleventh drive mechanism 313. The other end of the eleventh drive mechanism 313 is connected to the wire clamp. The ninth drive mechanism 310 is configured to drive the eleventh drive mechanism 313 to move up and down, so as to adjust the height of the wire clamp. The eleventh drive mechanism 313 is configured to drive the wire clamp to move left and right. The twelfth drive mechanism 315 is configured to drive the ninth drive mechanism 310, thereby driving the wire clamp to move back and forth.

The ninth drive mechanism 310 and the eleventh drive mechanism 313 are connected to the control unit 7.

Figure 29:
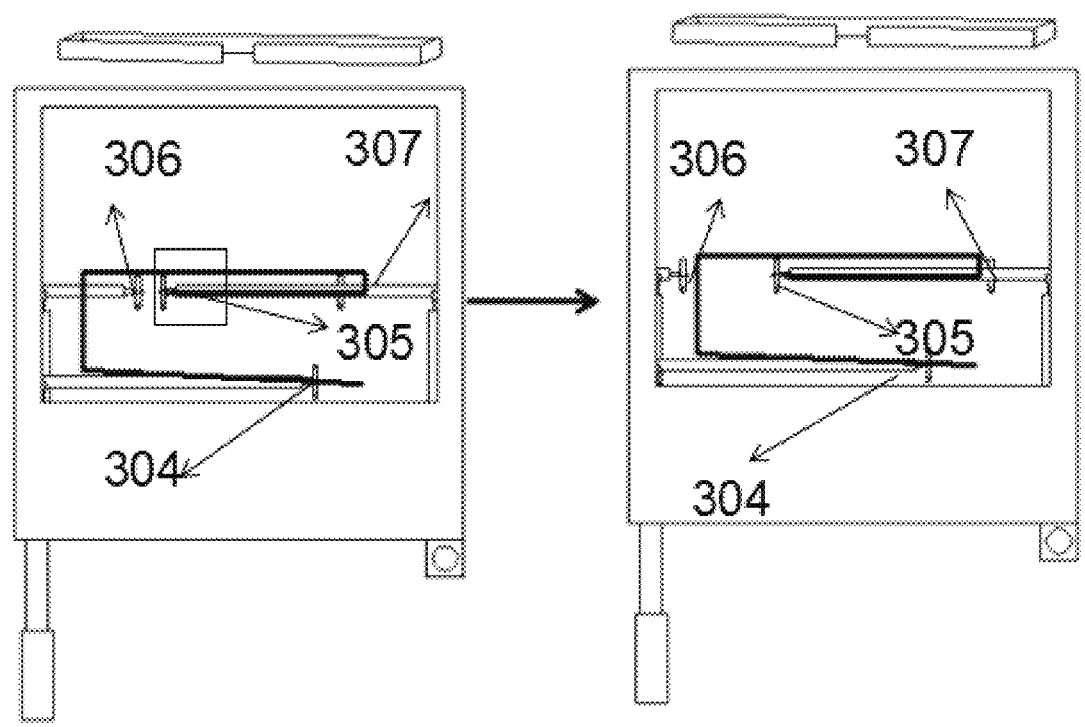
FIG. 29 is a schematic diagram illustrating that a wire clamp moves to drive a steel wire to tension and bind a big bale of reeds according to an implementation of the present disclosure.
Figure 33:
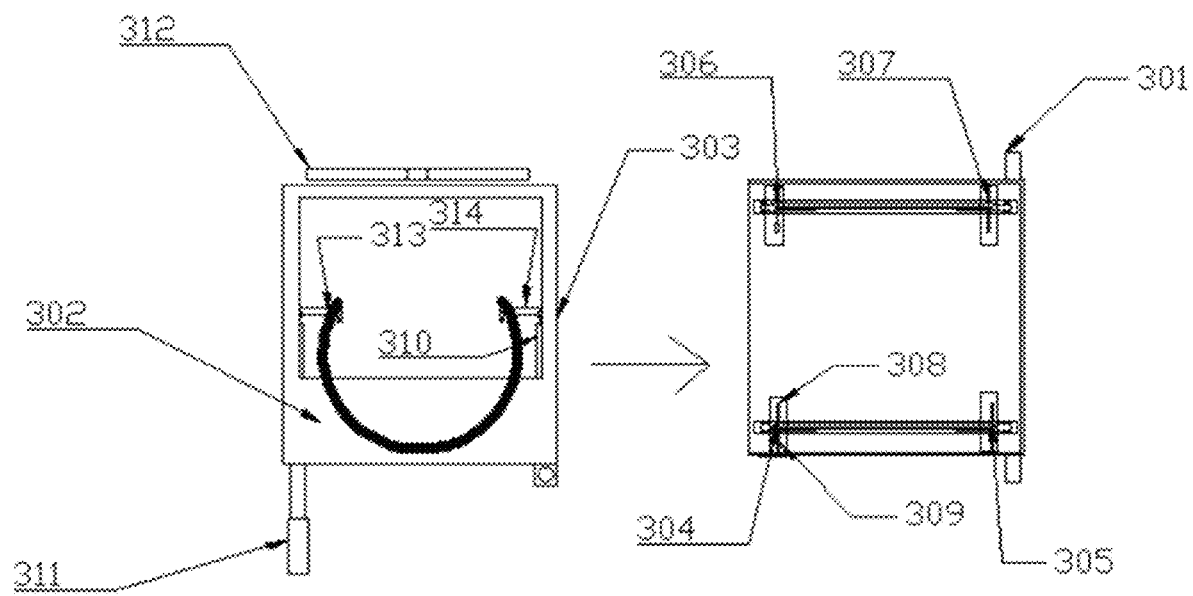
FIG. 33 is a schematic view of preparation of baling in horizontal stacking according to an implementation of the present disclosure.

FIG. 29 is a schematic diagram illustrating that a wire clamp moves to drive a steel wire to tension and bind a big bale of reeds according to an implementation of the present disclosure. The first wire clamp 304 and the second wire clamp 305 move to release the steel wire. The third wire clamp 306 and the fourth wire clamp 307 move in opposite directions to tension the steel wire. In an implementation of the present disclosure, the seventh drive mechanism 308, the eighth drive mechanism 309, the ninth drive mechanism 310, the eleventh drive mechanism 313, and the twelfth drive mechanism 315 each are a hydraulic cylinder. As shown in FIG. 33, in an implementation of the present disclosure, the wire clamp includes two wire clamping members, a shaft, a seventh drive mechanism 308, and an eighth drive mechanism 309.

The two wire clamping members are connected through the shaft, and arranged in an X shape. The two wire clamping members are respectively connected to the seventh drive mechanism 308 and the eighth drive mechanism 309. The seventh drive mechanism 308 and the eighth drive mechanism 309 are connected to the control unit 7. The seventh drive mechanism 308 and the eighth drive mechanism 309 respectively drive the wire clamping members to rotate around the shaft, thereby adjusting an included angle between the wire clamping members to clamp or release the steel wire 314.

Figure 31:
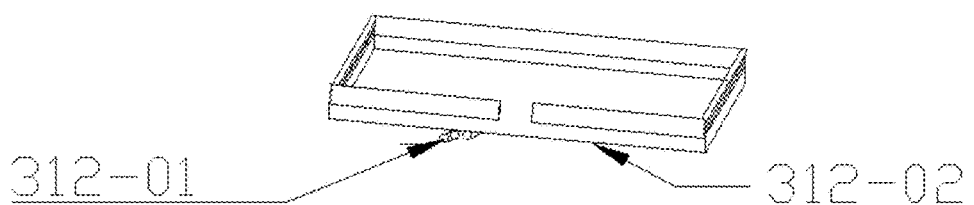
FIG. 31 is a schematic view of a movement process of a wire box according to an implementation of the present disclosure.
Figure 32:
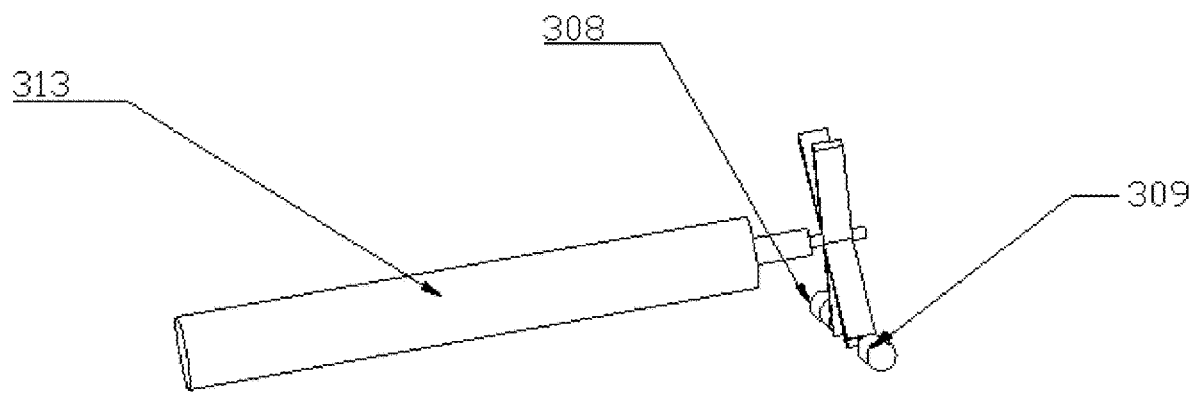
FIG. 32 is a schematic structural view of a wire clamp according to an implementation of the present disclosure.

In an implementation of the present disclosure, the feed box 3 further includes a rotating shaft 301 and a tenth drive mechanism 311. The rotating shaft 301 is provided at a side of the feed box housing 302 close to a feed box door 303, with one end connected to the harvester frame through a bearing. Provided at a side of the feed box housing 302 away from the feed box door 303, the tenth drive mechanism 311 is configured to drive one side of the feed box housing 302 to move up and down, such that the feed box housing 302 rotates around the rotating shaft 301 to unload the big bale of reeds from the feed box door 303, as shown in FIG. 31.

The tenth drive mechanism 311 is connected to the control unit 7. As shown in FIG. 31, in an implementation of the present disclosure, a wire box 312, a displacement sensor, a photoelectric sensor 312-01, and a wire box switch 312-02 are provided on the feed box housing 302.

The steel wire 314 is provided in the wire box 312. The displacement sensor is configured to detect an upward moving height of the wire clamp. When the displacement sensor detects that the wire clamp moves up to a preset height, and transmits a signal to the control unit 7, the control unit 7 controls the wire box switch 312-02 to open the wire box 312. The steel wire 314 falls off from the wire box 312. After sensing that the steel wire 314 falls off, the photoelectric sensor 312-01 transmits a signal to the control unit 7. The control unit 7 controls the wire box switch 312-02 to close the wire box 312.

In an implementation of the present disclosure, a movement process of the baling mechanism is as follows:

After small bales of reeds are placed completely in sequence, the first wire clamp 304, the second wire clamp 305, the third wire clamp 306, and the fourth wire clamp 307 move to a position under the wire box 312 under an action of the ninth drive mechanism 310. The steel wire 314 falls into the four wire clamps from the wire box 312. The seventh drive mechanism 308 and the eighth drive mechanism 309 at two sides of the wire clamps moves in opposite directions to clamp the steel wire. After the steel wire is clamped, under movement of the ninth drive mechanism 310, the steel wire 314 moves to a middle position of the big bale of reeds.

Figure 34:
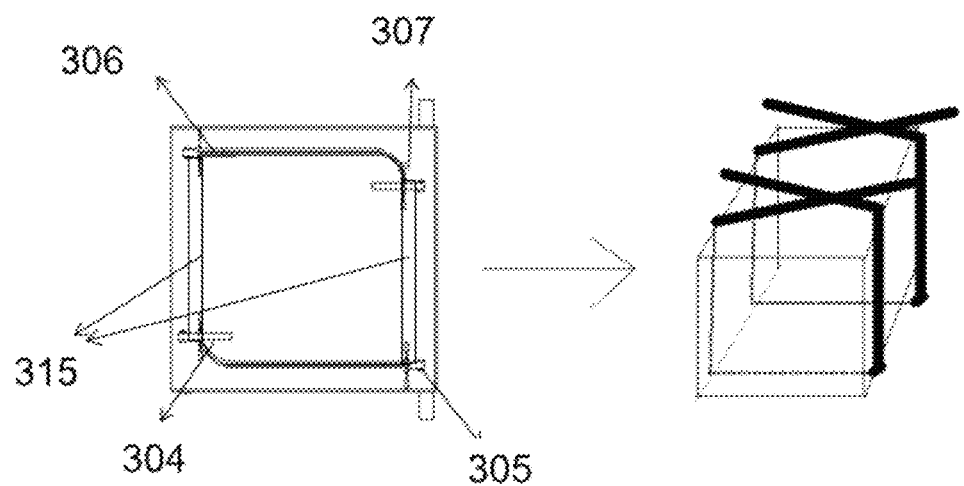
FIG. 34 is a schematic view of baling in horizontal stacking according to an implementation of the present disclosure.

As shown in FIG. 34, in an implementation of the present disclosure, the reeds are cut by the header. The reeds are conveyed by the clamping conveyor chain to the knotter 2. The reeds are knotted by the knotter 2 into the small bales. Through the mechanical clamps, the knotted small bales of reeds are stacked to the feed box 3. When the steel wire 314 is located at the middle position of the big bale of reeds, the first wire clamp 304 and the second wire clamp 305 can move in opposite directions to tense the steel wire, because the first wire clamp 304 and the second wire clamp 305 are provided high and low, and a height of the second wire clamp 305 is greater than a height of the first wire clamp 304. Thereafter, the seventh drive mechanism 308 and the eighth drive mechanism 309 at two sides of the third wire clamp 306 and the fourth wire clamp 307 move in opposite directions to release the wire clamp, and move down under the action of the ninth drive mechanism 310. By this time, one side of the steel wire 314 is suspended at the middle position of the big bale of reeds. The other side of the steel wire 314 is continuously clamped by the first wire clamp 304 and the second wire clamp 305. Under an action of the eleventh drive mechanism 313, the first wire clamp 304 and the second wire clamp 305 are pushed to move toward one another, such that the steel wire 314 is intertwined and attached to the big bale of reeds. A left end and a right end of the steel wire 314 are staggered to ensure that the tensed steel wire has an enough binding force to the big bale of reeds.

Figure 30:
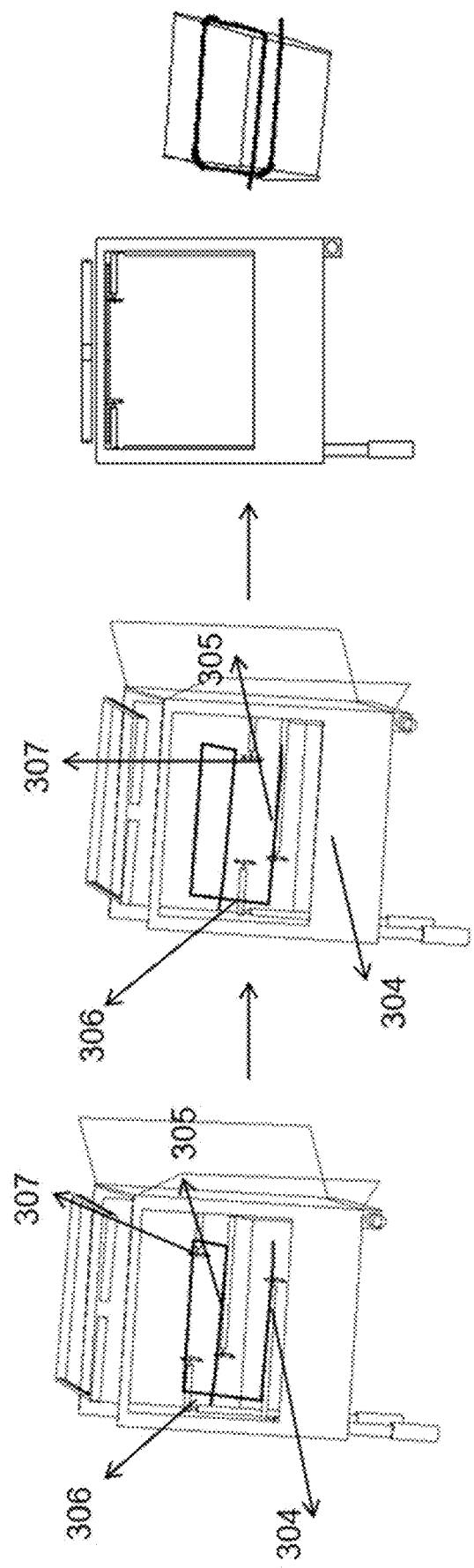
FIG. 30 is a schematic view of an unloading process of a feed box upon completion of baling according to an implementation of the present disclosure.

As shown in FIG. 30, after the big bale of reeds is bound, the four wire clamps move away from the steel wire 314 through the ninth drive mechanism 310. By this time, the feed box door 303 is open, the left side of the feed box 3 is raised through the tenth drive mechanism 311, and the big bale of reeds falls into a field along an oblique plane under an action of a gravity. Then, the feed box 3 is restored to an original position for next baling, the wire clamps clamp the steel wire again, and the feed box 3 is connected to the chassis 6 of the reed harvester through the rotating shaft 301.

After the big bale of reeds falls off, and the wire clamps move up to a position under the wire box 312, the wire box switch 312-02 is turned on, and the steel wire falls onto the wire clamps. After the photoelectric sensor 312-01 on the wire box switch 312-02 senses that the steel wire falls off, the wire box 312 is closed immediately to prevent other steel wires from falling off to cause a waste. The wire box 312 may be welded on the feed box 3.

The wire clamps clamp the steel wire 314 by allowing the seventh drive mechanism 308 and the eighth drive mechanism 309 to move in opposite directions. By allowing the seventh drive mechanism and the eighth drive mechanism to move in the opposite direction, the steel wire 314 is released. A displacement of the steel wire in a left-right direction is adjusted through the eleventh drive mechanism 313.

In an implementation of the present disclosure, as shown in FIG. 33, if the bale of reeds is stacked horizontally, the arc-shaped steel wires 314 are placed into the four wire clamps manually. The hydraulic cylinders at two sides of the wire clamps move in opposite direction to clamp the steel wires 314. After the steel wires 314 are clamped, under movement of a wire clamp lifting hydraulic cylinder, the steel wires are conveyed to a bottom of the feed box. Two through grooves are formed in the bottom of the feed box, without affecting the steel wire to move to a position below the bottom of the feed box. The four wire clamps move toward the two sides. Then, the small bales of reeds are stacked horizontally. After the small bales of reeds are stacked completely in sequence, the four wire clamps drive two steel wires to surround the stacked bales of reeds from bottom to top.

As shown in FIG. 34, after the wire clamps move to a position above the bales of reeds, the first wire clamp 304 and the second wire clamp 305 are staggered, and the third wire clamp 306 and the fourth wire clamp 307 are staggered. After staggered, the first wire clamp 304 and the second wire clamp 305 move toward one another, and the third wire clamp 306 and the fourth wire clamp 307 move toward one another. For example, the first wire clamp 304 moves up appropriately and then tensioned backward, and the second wire clamp 305 moves down appropriately and then tensioned backward. For example, through the hydraulic cylinder, the bales of reeds are tensioned. The two steel wires come into use at the same time to increase a binding force for the big bale of reeds.

A control method of the baling-stacking device includes the following steps:

The reeds are knotted by the knotter 2 into small bales. The small bales of reeds are stacked by the stacking mechanism 4 to the feed box 3 vertically or horizontally. A plurality of small bales of reeds are knotted into the big bale in the feed box 3.

The control unit 7 controls the drive component of the stacking mechanism 4, and drives the first mechanical clamp 401 and the second mechanical clamp 402 to move along an X-axis direction, a Y-axis direction, and a Z-axis direction, such that the small bales of reeds are clamped by the first mechanical clamp 401 and the second mechanical clamp 402 and stacked to the feed box 3 sequentially.

The control unit 7 controls the wire clamps of the baling mechanism in the feed box 3 to clamp the steel wire 314. The wire clamps are driven by the drive mechanism to knot the small bales of reeds into the big bale.

In an implementation of the present disclosure, in response to the vertical stacking, the control unit 7 controls the stacking mechanism 4 to vertically stack a plurality of small bales of reeds to the feed box 3.

When a number of the small bales of reeds reaches a preset value, the control unit 7 controls the drive mechanism to drive the wire clamps to move up. When the displacement sensor detects that the wire clamps move up to a preset height, and transmits a signal to the control unit 7, the control unit 7 controls the wire box switch 312-02 to open the wire box 312. The steel wire 314 falls off from the wire box 312. After sensing that the steel wire 314 falls off, the photoelectric sensor 312-01 transmits a signal to the control unit 7. The control unit 7 controls the wire box switch 312-02 to close the wire box 312.

The control unit 7 controls the drive mechanism to drive the wire clamps to knot the plurality of small bales of reeds into the big bale.

In an implementation of the present disclosure, by controlling the ninth drive mechanism 310, the control unit 7 makes the first wire clamp 304 and the second wire clamp 305 opposite to each other achieve different heights, and clamp the steel wire 314. The control unit 7 controls the third wire clamp 306 and the fourth wire clamp 307 opposite to each other to release the steel wire 314, and the first wire clamp 304 and the second wire clamp 305 to continuously clamp the steel wire 314 and move toward one another, such that the steel wire is intertwined and attached to the big bale of reeds, thereby completing the baling.

As shown in FIGS. 34, 35A, 35B and 35C, in an implementation of the present disclosure, in response to the horizontal stacking, the control unit 7 controls the stacking mechanism 4 to horizontally stack a plurality of small bales of reeds to the feed box 3.

When a number of the small bales of reeds reaches a preset value, the control unit 7 controls the ninth drive mechanism 310 to drive the wire clamps to move up to a preset position. The first wire clamp 304 and the second wire clamp 305 are connected to a same steel wire 314, and the third wire clamp 306 and the fourth wire clamp 307 are connected to a same steel wire 314.

Figures 35A, 35B, 35C:
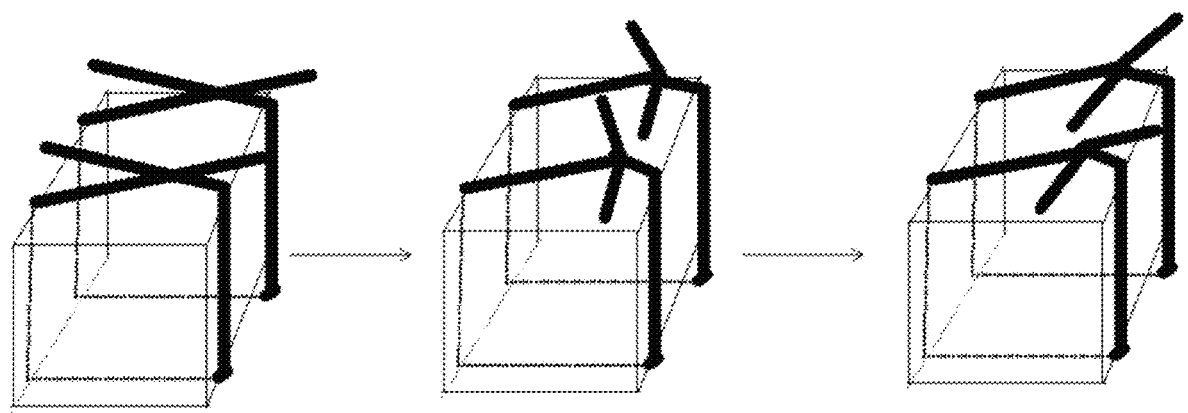

The first wire clamp 304 and the second wire clamp 305 are staggered in the Y-axis direction, and the third wire clamp 306 and the fourth wire clamp 307 are staggered in the Y-axis direction. The first wire clamp 304 and the second wire clamp 305 move toward one another, and the third wire clamp 306 and the fourth wire clamp 307 move toward one another. The small bales of reeds are tensioned through the steel wires 314. The two steel wires 314 come into use at the same time to increase a binding force for the big bale of reeds, as shown in FIG. 35A. Under the action of the twelfth drive mechanism 315, the first wire clamp 304 and the second wire clamp 305 move in opposite directions in the Y-axis direction, and the third wire clamp 306 and the fourth wire clamp 307 move in opposite directions in the Y-axis direction, as shown in FIG. 35B. At last, under the action of the eleventh drive mechanism 313, the first wire clamp 304 and the second wire clamp 305 move in opposite directions in the Y-axis direction to form a loop, and the third wire clamp 306 and the fourth wire clamp 307 move in opposite directions in the Y-axis direction to form a loop, thereby completing the baling of the reeds, as shown in FIG. 35C. The present disclosure uses two mechanical clamps to convey the bales of reeds instead of manual work. By adjusting the hydraulic cylinder at the right position, a distance between the two mechanical clamps is controlled to ensure that the bales of reeds are clamped. The mechanical clamps are adjusted to move in opposite directions to clamp the bales of reeds and convey the bales of reeds to the feed box in the y-axis direction. Then, the hydraulic cylinder at the right position is adjusted to move in a same direction, such that the mechanical clamps clamp the bales of reeds and convey the bales of reeds to the feed box in the x-axis direction.

By controlling the displacement of the hydraulic cylinder, the present disclosure is accurate to vertically stack the bales of reeds to the feed box, makes reasonable use of a space in the feed box, and improves harvesting efficiency. By rotating the hydraulic motor, the present disclosure realizes a process from the vertical stacking to the horizontal stacking for the bales of reeds, and is applied to stacking of feed boxes of different types.

When the efficient reed harvester provided by the present disclosure is used for harvesting, the crawler chassis 6 can be adapted for deep mud fields and wetlands, and is not prone to subsidence. The laser radar 104 monitors the average height $h_{avg}$ of the reeds in the preharvest region, the knife height sensor 103-1 detects the height of the knife 103 above the ground, the transverse conveyor device 102 feeds the reeds from two sides to a middle, and the intermediate transverse conveyor mechanism 102-5 can further adjust its height automatically according to the gravity center of the reeds, which ensures desirable feeding for the reeds. The upstanding clamping longitudinal conveyor device 101 feeds the reeds backward to the transverse conveyor device 102, and the root debris cleaning device 106 can clean mud at bottoms of the stems of the reeds in conveyance, which can improve harvesting quality of the reeds. The root disc knife apparatus 107 cuts the cleaned bottom roots of the reeds in conveyance, and makes the bottom roots tidy, which facilitate conveyance, knotting and stacking. The upstanding clamping longitudinal conveyor device 101 conveys the root cleaned reeds to the knotter 2 in an upstanding manner for knotting of small bales. The knotted small bales are stacked by the mechanical clamps to the feed box 3 in sequence. The stacking mechanism 4 can realize vertical stacking and horizontal stacking. The small bales stacked completely are knotted into the big bale in the feed box 3. After the big bale is knotted, the feed box 3 can move up and down automatically for unloading, thereby completing efficient high-quality harvesting of the reeds.

It should be understood that although this specification is described in accordance with the embodiment, not every embodiment only includes one independent technical solution. This description of the specification is for the sake of clarity only. Those skilled in the art should take the specification as a whole, and the technical solutions in embodiments can also be appropriately combined to form other implementations that can be understood by those skilled in the art.

The series of detailed descriptions listed above are only specific illustration of feasible embodiments of the present disclosure, rather than limiting the claimed scope of the present disclosure. All equivalent embodiments or changes made without departing from the technical spirit of the present disclosure should be included in the protection scope of the present disclosure.

The invention claimed is:

1. An efficient reed harvester, comprising:
a preharvest detection unit, a cutting device, a conveyor device, a baling-stacking device, a chassis, and a control unit, wherein the preharvest detection unit, the cutting device, the conveyor device, the baling-stacking device, and the control unit are provided on the chassis; and the chassis is a crawler chassis;
the preharvest detection unit is configured to detect height information of reeds in a preharvest region, and transmit the height information to the control unit;
the cutting device is configured to cut stems of the reeds;
the conveyor device is configured to gather and clamp the stems of the reeds, and convey the stems backward to the baling-stacking device;
the baling-stacking device is located behind the conveyor device, and the baling-stacking device is configured to knot the reeds into small bales, stack the small bales of the reeds vertically or horizontally, and knot the small bales of the reeds into a big bale;
the control unit is connected to the preharvest detection unit, the cutting device, the conveyor device, and the baling-stacking device; the control unit is configured to calculate an average height $h_{avg}$ of the reeds in the preharvest region according to the height information of the reeds in the preharvest region, and adjust a height of the conveyor device according to the average height of the reeds; and the control unit controls the baling-stacking device to stack the small bales of the reeds vertically or horizontally, and knot the small bales of the reeds into the big bale;
the conveyor device comprises an upstanding clamping longitudinal conveyor device and a transverse conveyor device;
the upstanding clamping longitudinal conveyor device is provided behind the transverse conveyor device; the transverse conveyor device is configured to gather the reeds at two sides to a middle and convey the reeds to the upstanding clamping longitudinal conveyor device; and the upstanding clamping longitudinal conveyor device is configured to clamp the stems of the reeds and convey the stems backward to the baling-stacking device;
the transverse conveyor device comprises an upper transverse conveyor mechanism, an intermediate transverse conveyor mechanism, a lower transverse conveyor mechanism, a height sensor, a transverse conveyor device hydraulic cylinder set, and a displacement sensor;
the upper transverse conveyor mechanism is provided uppermost; a plurality of feeding teeth are arranged on the upper transverse conveyor mechanism; and the upper transverse conveyor mechanism is configured to gather and clamp upper portions of the stems of the reeds and feed the upper portions;
the intermediate transverse conveyor mechanism is provided under the upper transverse conveyor mechanism; a plurality of feeding teeth are arranged on the intermediate transverse conveyor mechanism; and the intermediate transverse conveyor mechanism is configured to gather and clamp intermediate portions of the stems of the reeds and feed the intermediate portions;

the lower transverse conveyor mechanism is provided under the intermediate transverse conveyor mechanism; the lower transverse conveyor mechanism is provided with a plurality of feeding fingers; and the lower transverse conveyor mechanism is configured to gather and clamp lower portions of the stems of the reeds and feed the lower portions;

the height sensor is configured to detect a height of the intermediate transverse conveyor mechanism;

the transverse conveyor device hydraulic cylinder set is provided between the upper transverse conveyor mechanism and the intermediate transverse conveyor mechanism, and the transverse conveyor device hydraulic cylinder set is configured to control a distance between the upper transverse conveyor mechanism and the intermediate transverse conveyor mechanism; and the displacement sensor is configured to detect an amount of expansion and contraction of the transverse conveyor device hydraulic cylinder set;

the control unit is connected to the height sensor, the transverse conveyor device hydraulic cylinder set, and the displacement sensor, and the control unit is configured to adjust the height of the intermediate transverse conveyor mechanism through the transverse conveyor device hydraulic cylinder set according to detection information of the height sensor and the displacement sensor;

the efficient reed harvester further comprises a knife height sensor, wherein the knife height sensor is connected to the control unit;

the knife height sensor is configured to detect a height $h_1$ of a knife, and transmit the height $h_1$ to the control unit;

the control unit is configured to calculate an actual length $h_2 = h_{avg} - h_1$ of harvested reeds according to the average height $h_{avg}$ of the reeds and the height $h_1$ of the knife, and adjust the amount of expansion and contraction of the transverse conveyor device hydraulic cylinder set according to the detection information of the height sensor and the displacement sensor, such that the intermediate transverse conveyor mechanism is located at $$\frac{2h_2}{3}$$

for feeding;

the baling-stacking device comprises a knotter, a feed box, and a stacking mechanism; the stacking mechanism is located between the knotter and the feed box; the knotter is configured to knot the reeds into the small bales; the stacking mechanism is configured to stack the small bales of the reeds to the feed box vertically or horizontally; and the feed box is configured to knot the small bales of the reeds into the big bale; the feed box comprises a feed box housing; a baling mechanism is provided in the feed box housing; the baling mechanism comprises a wire clamp and a drive mechanism; the wire clamp is configured to clamp a steel wire; the drive mechanism is configured to drive the wire clamp to knot the small bales of the reeds into the big bale; and the control unit is connected to the feed box and the stacking mechanism; and the control unit is configured to control the stacking mechanism to stack the small bales of the reeds to the feed box vertically or horizontally, and control the feed box to knot the small bales of the reeds into the big bale; and the stacking mechanism comprises a first mechanical clamp, a second mechanical clamp, and a drive component connected to the control unit; and the first mechanical clamp and the second mechanical clamp are opposite to each other; the first mechanical clamp and the second mechanical clamp are connected to the drive component; the drive component is configured to drive the first mechanical clamp and the second mechanical clamp to move along an X-axis direction, a Y-axis direction, and a Z-axis direction; and the first mechanical clamp and the second mechanical clamp are configured to clamp and stack the small bales of the reeds to the feed box.

2. The efficient reed harvester according to claim 1, wherein the preharvest detection unit comprises a laser radar; and the laser radar is configured to scan to-be-harvested reeds in front of a header at a sampling interval T, acquire point cloud data for reflection points of the to-be-harvested reeds in a polar coordinate of the laser radar, and transmit the point cloud data to the control unit; and the control unit is configured to process the point cloud data to obtain a point cloud in a square region specified in front of the header, uniformly segment the square region into a plurality of sub-regions that are equal, calculate a maximum of a point cloud y coordinate in each of the plurality of sub-regions, take the maximum $y_{ijmax}$ as an average height of reeds in each of the plurality of sub-regions, and seek an average $y_{avg}$ in the square region according to the $y_{ijmax}$ representing the average height of the reeds in each of the plurality of sub-regions, wherein the average represents the average height $h_{avg}$ of the reeds in the preharvest region.

3. The efficient reed harvester according to claim 1, wherein transverse the upper conveyor mechanism and the intermediate transverse conveyor mechanism are structurally the same, and each comprise transverse conveyor units opposite to each other; a conveyor roller is provided between the upper transverse conveyor mechanism and the intermediate transverse conveyor mechanism; and a belt is provided on the conveyor roller;

the transverse conveyor units each comprise a driving sprocket, a driven sprocket, a conveyor chain strip, an inner chain plate, the plurality of feeding teeth, a support frame, a reed separating ring, and an annular support arm;

the driving sprocket and the driven sprocket are provided on the support frame;

the conveyor chain strip is provided on the driving sprocket and the driven sprocket;

the inner chain plate is provided on the conveyor chain strip;

the transverse conveyor device hydraulic cylinder set is provided under the support frame;

the plurality of feeding teeth are uniformly arranged on the inner chain plate;

the annular support arm comprises a top connected to the reed separating ring, and a bottom connected to the transverse conveyor device hydraulic cylinder set;

the reed separating ring is provided at a periphery of the conveyor chain strip;

the conveyor roller is connected to an upper hydraulic motor; and both the driving sprocket of the upper transverse conveyor mechanism and the driving sprocket of the intermediate transverse conveyor mechanism are connected to the conveyor roller; the upper hydraulic motor drives the conveyor roller to rotate; and the conveyor roller drives the conveyor chain strip of the upper transverse conveyor mechanism and the conveyor chain strip of the intermediate transverse conveyor mechanism to rotate synchronously.

4. The efficient reed harvester according to claim 1, wherein the lower transverse conveyor mechanism comprises lower transverse conveyor units opposite to each other; the lower transverse conveyor units each comprise a driving pulley, a driven pulley, a conveyor belt, a plurality of mounting seats, the plurality of feeding fingers, a lower support frame, a lower support post, a support arm, and a lower hydraulic motor;
  the support arm is provided on a harvester frame; the lower support post is provided on the support arm; and the lower support frame is provided on the lower support post;
  the driving pulley and the driven pulley are provided on the lower support frame; and the driving pulley is connected to the lower hydraulic motor;
  the conveyor belt is provided on the driving pulley and the driven pulley; and
  the plurality of mounting seats are uniformly arranged on the conveyor belt; and the plurality of feeding fingers are respectively provided on the plurality of mounting seats.

5. The efficient reed harvester according to claim 1, wherein the upstanding clamping longitudinal conveyor device comprises two symmetric upstanding longitudinal conveyor mechanisms and a clamping conveyor chain height adjustment mechanism;
  the two symmetric upstanding longitudinal conveyor mechanisms clamp upstanding reeds when longitudinally conveying the reeds;
  the clamping conveyor chain height adjustment mechanism comprises a position sensor and a lifting device; the position sensor is configured to detect a current height of the two symmetric upstanding longitudinal conveyor mechanisms, and transmit the current height to the control unit; and the lifting device is connected to the two symmetric upstanding longitudinal conveyor mechanisms; and
  the control unit is connected to the lifting device; and the control unit is configured to calculate a height of a gravity center of the reeds according to the average height $h_{avg}$ of the reeds in the preharvest region and a height $h_1$ of a knife above ground, seek a height difference between the height of the gravity center of the reeds and the current height of the two symmetric upstanding longitudinal conveyor mechanisms, and control, according to the height difference, the lifting device to adjust a height of the two symmetric upstanding longitudinal conveyor mechanisms to correspond to the gravity center of the reeds in the preharvest region.

6. The efficient reed harvester according to claim 5, wherein the lifting device comprises a speed reduction motor, a coupled twin winch, a first pulley set, a second pulley set, a support, and a sleeve;
  the support is provided at two sides of the upstanding clamping longitudinal conveyor device; the support is connected to a girder of a header; and the upstanding clamping longitudinal conveyor device is connected to a vertical beam of the support through the sleeve;
  the speed reduction motor and the coupled twin winch are provided on a top of the support; the first pulley set is provided at two sides of an upper portion of the support, and connected to an upper portion of the upstanding clamping longitudinal conveyor device; and the second pulley set is provided at two sides of a lower portion of the support, and connected to a lower portion of the upstanding clamping longitudinal conveyor device; wire ropes of the first pulley set and of the second pulley set are connected to the coupled twin winch; and the coupled twin winch driven by the speed reduction motor drives the wire ropes to realize retraction and release of the wire ropes, thereby driving the upstanding clamping longitudinal conveyor device to move up and down along the vertical beam of the support.

7. The efficient reed harvester according to claim 5, wherein the two symmetric upstanding longitudinal conveyor mechanisms each comprise an upstanding conveyor unit and a sleeve; and the upstanding conveyor unit comprises a traction roller, a driven roller, a clamping conveyor chain, an upper beam, and a lower beam; and
  the upper beam is located above the lower beam; the traction roller comprises one end connected to one end of the upper beam, and an other end connected to one end of the lower beam; the driven roller comprises one end connected to an other end of the upper beam, and an other end connected to an other end of the lower beam; the clamping conveyor chain surrounds the traction roller and the driven roller; the upper beam and the lower beam are connected to the sleeve; the sleeve is provided on a vertical beam of a support; and the sleeve is slidable up and down along the vertical beam of the support, thereby driving the upstanding conveyor unit to move up and down.

8. The efficient reed harvester according to claim 1, further comprising a root debris cleaning device, wherein the root debris cleaning device is provided under the upstanding clamping longitudinal conveyor device; and the root debris cleaning device comprises a brush, a rotating shaft, and a motor; the rotating shaft is connected to an output shaft of the motor; and the brush is provided on the rotating shaft.

9. The efficient reed harvester according to claim 1, further comprising a root disc knife apparatus, wherein the root disc knife apparatus comprises a disc knife device, a drive device, a height adjusting device, and a vibration damping device;
  the height adjusting device is provided on a harvester frame;
  the disc knife device is provided on the height adjusting device;
  the vibration damping device is provided on the disc knife device;
  the drive device is connected to the disc knife device, and provides power for the disc knife device; and
  the disc knife device comprises a plurality of disc knives and a knife rest; and the plurality of disc knives are provided on the knife rest equidistantly.

10. The efficient reed harvester according to claim 9, wherein the drive device comprises a plurality of pinions, a plurality of gears, two transmission pulleys, a transmission belt, and a hydraulic motor;
  the plurality of pinions are arranged on the knife rest, and respectively connected to the plurality of disc knives through a transmission shaft;
  the plurality of gears each are provided between and engaged with two adjacent ones of the plurality of pinions;

one of the two transmission pulleys is provided on the transmission shaft between one of the plurality of pinions and a corresponding one of the plurality of disc knives, and an other of the two transmission pulleys is provided at an output end of the hydraulic motor; and the transmission belt is provided on the two transmission pulleys.

11. The efficient reed harvester according to claim 9, wherein the height adjusting device comprises a first side plate, a second side plate, a first height adjustment hydraulic cylinder, a second height adjustment hydraulic cylinder, a first height adjusting rod, and a second height adjusting rod;
  the first side plate and the second side plate are respectively provided at two sides of the knife rest;
  the first height adjusting rod comprises one end connected to the knife rest, and an other end connected to the first height adjustment hydraulic cylinder; and
  the second height adjusting rod comprises one end connected to the knife rest, and an other end connected to the second height adjustment hydraulic cylinder.

12. The efficient reed harvester according to claim 11, wherein the vibration damping device comprises vibration absorbers; and the vibration absorbers are respectively provided on the first side plate and the second side plate.

13. The efficient reed harvester according to claim 12, wherein the vibration damping device further comprises damping springs;
  the first side plate and the second side plate are respectively provided with the damping springs;
  the damping spring at one side of the first side plate comprises one end connected to the first side plate, and an other end connected to the first height adjustment hydraulic cylinder; and
  the damping spring at one side of the second side plate comprises one end connected to the second side plate, and an other end connected to the second height adjustment hydraulic cylinder.

* * * * *